United States Patent
Kagata et al.

(10) Patent No.: US 7,908,739 B2
(45) Date of Patent: Mar. 22, 2011

(54) MOTOR ASSEMBLY AND METHOD OF MANUFACTURING THEREOF

(75) Inventors: Akira Kagata, Kyoto (JP); Kimihiko Hajota, Kyoto (JP); Yoshiki Okayama, Kyoto (JP); Katsutoshi Hamada, Kyoto (JP)

(73) Assignee: Nidec Corporation, Kyoto (JP)

( * ) Notice: Subject to any disclaimer, the term of this patent is extended or adjusted under 35 U.S.C. 154(b) by 849 days.

(21) Appl. No.: 11/753,138

(22) Filed: May 24, 2007

(65) Prior Publication Data

US 2007/0271769 A1   Nov. 29, 2007

(30) Foreign Application Priority Data

May 24, 2006   (JP) .................................. 2006-143941
Dec. 18, 2006   (JP) .................................. 2006-339695

(51) Int. Cl.
   *G11B 5/127*   (2006.01)
   *H04R 31/00*   (2006.01)

(52) U.S. Cl. .................. 29/603.03; 29/603.01; 29/596; 29/701; 29/736; 360/99.12; 360/128; 360/129; 219/121.6; 219/121.64; 219/121.73

(58) Field of Classification Search .............. 29/603.03, 29/603.01, 596, 701, 736; 360/99.12, 128, 360/129; 219/121.6, 121.64, 121.73
See application file for complete search history.

(56) References Cited

U.S. PATENT DOCUMENTS

| | | | |
|---|---|---|---|
| 5,256,850 A | | 10/1993 | Maegawa et al. |
| 5,347,415 A | * | 9/1994 | Murata et al. ................ 360/137 |
| 5,877,571 A | * | 3/1999 | Brooks ....................... 360/99.12 |
| 6,023,392 A | * | 2/2000 | Kim ............................ 360/97.01 |
| 6,034,841 A | * | 3/2000 | Albrecht et al. ........... 360/97.01 |
| 6,343,877 B1 | | 2/2002 | Miura et al. |
| 6,375,357 B2 | | 4/2002 | Miura et al. |
| 6,703,584 B2 | * | 3/2004 | Church et al. ........... 219/121.85 |
| 2003/0081347 A1 | * | 5/2003 | Neal et al. .................. 360/97.01 |
| 2008/0165448 A1 | * | 7/2008 | Ichikawa et al. ........... 360/97.02 |

FOREIGN PATENT DOCUMENTS

| | | |
|---|---|---|
| JP | 56-058759 A | 5/1981 |
| JP | 57-36564 A | 2/1982 |
| JP | 02-035360 U | 3/1990 |
| JP | 4-252414 A | 9/1992 |
| JP | 4-318315 A | 11/1992 |
| JP | 5-73866 A | 3/1993 |
| JP | 7-10861 U | 2/1995 |
| JP | 7-19849 U | 4/1995 |

(Continued)

OTHER PUBLICATIONS

Dr. Rudiger Paschotta, Q-switched Lasers: YAG versus Vanadate, Sep. 16, 2006. http://www.rp-photonics.com/spotlight_2006_09_16.html.*

*Primary Examiner* — Derris H Banks
*Assistant Examiner* — Jeffrey Carley
(74) *Attorney, Agent, or Firm* — Keating & Bennett, LLP

(57) ABSTRACT

In a manufacturing method, energy beam heat is radiated to a target area of the motor assembly which is used for a storage disk drive. By radiating energy beam thereto, a portion of the motor assembly is deformed in a non-contact manner, thus, without being affected by elastic recovery of a portion of the motor assembly to be deformed, the machining accuracy of the motor assembly is adjusted in a precise manner.

34 Claims, 20 Drawing Sheets

FOREIGN PATENT DOCUMENTS

| | | |
|---|---|---|
| JP | 7-134885 A | 5/1995 |
| JP | 11-194063 A | 7/1999 |
| JP | 2000-324753 A | 11/2000 |
| JP | 2001-78387 A | 3/2001 |
| JP | 2001-101777 A | 4/2001 |
| JP | 2002-373468 A | 12/2002 |
| JP | 2002-373485 A | 12/2002 |
| JP | 2004-114083 A | 4/2004 |

* cited by examiner

MOTOR ASSEMBLY AND METHOD OF MANUFACTURING THEREOF

BACKGROUND OF THE INVENTION

1. Field of the Invention

The present invention generally relates to an electrically powered motor used for rotationally driving a storage disk(s) in a storage disk drive and a method of manufacturing thereof.

2. Description of the Related Art

Data storage disk drives for storage devices (e.g., a hard disk drive) conventionally include a spindle motor for rotationally driving a data storage disk(s) (hereinafter, such spindle motor will be simply referred to as "motor"). The motor generally includes a rotor hub and the data storage disk is arranged on the rotor hub. One motor bearing mechanism that has been adopted is the hydrodynamic-pressure bearing mechanism (hereinafter simply referred to as a hydrodynamic bearing mechanism). The rotor hub is supported so as to be rotatable relative to a base of the motor, centering on a center axis, via the hydrodynamic bearing mechanism.

In the data storage disk drive, a head assembly accesses any positions on the spinning data storage disk, in a state in which the heads have been brought adjacent to the data storage disk, to read and/or write information onto the data storage disk. Therefore, when the data storage disk is rotationally driven with deviating from the desired range of attitude angle, preferably perpendicular to the center axis (e.g., a runout of the data storage disk may be caused), the information may not be properly read/written onto the data storage disk (i.e., access error may be caused).

SUMMARY OF THE INVENTION

In order to overcome the problems described above, preferred embodiments of the present invention provide methods of manufacturing a motor assembly whose machining accuracy is preferably maintained.

According to a preferred embodiment of the present invention, a method of manufacturing a motor assembly used for a data storage drive device includes a step of retaining a motor assembly including a motor placing portion and an access unit placing portion. The motor placing portion includes at least a portion of a base of the motor assembly which is a plate-like flat portion and a motor to spin a data storage disk that is centered about a center axis. The access unit placing portion includes a portion of the base of the motor assembly which is a plate-like flat portion and an access unit to read and/or write information on the data storage disk. The method also includes a step of measuring a positional relationship between a first datum point and a second datum point. The method further includes a step of applying heat to a target area such that at least part of a displacement portion is displaced toward a direction from which the heat is applied such that the positional relationship between the first datum point and the second datum point is adjusted.

According to another preferred embodiment of the present invention, the heat is applied to the target area of the motor assembly by radiating energy beam to the target area. Through this configuration, the motor assembly is deformed without being affected by elastic recovery of a portion of the motor assembly to be deformed, enabling to control enhance the machining accuracy of the motor assembly in a precise manner.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
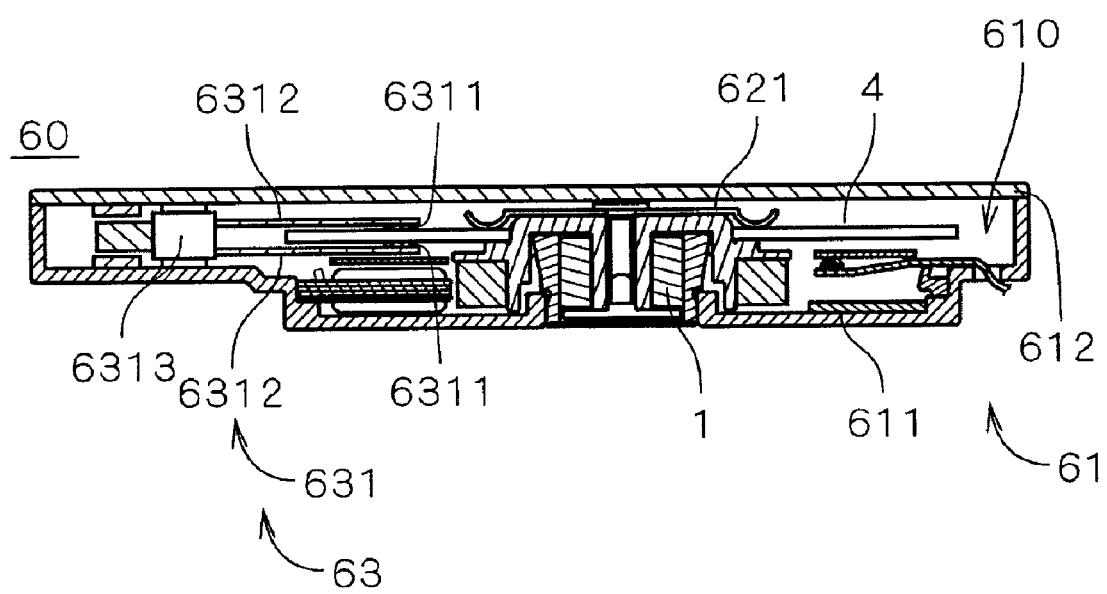
FIG. 1 is a drawing illustrating an internal configuration of a storage disk drive according to a first preferred embodiment of the present invention.

Referring to attached drawings preferred embodiments of the present invention will be described in detail. In the description of the present invention, words such as upper, lower, left, right, upward, downward, top, and bottom for explaining positional relationships between respective members and directions merely indicate positional relationships and directions in the drawings. Such words do not indicate positional relationships and directions of the members mounted in an actual device.

With reference to FIG. 1, a drawing illustrating the internal configuration of a storage disk drive 60 including an electrically powered spindle motor 1 (simply referred to as a motor 1 hereinafter) according to a first preferred embodiment of the present invention. The data storage disk drive 60 preferably is a hard disk drive (HDD), and includes: a discoid data storage disk 4 which stores information; an access unit 63 which writes information onto and (or) reads information from the data storage disk 4; the motor 1, which retains and spins the data storage disk 4; and a housing 61 defining an interior space 610 that accommodates the data storage disk 4, the access unit 63, and the motor 1.

As illustrated, the housing 61 includes a base 611 and a plate member 612. The base 611 has an inoperculated box shape, and the motor 1 and the access unit 63 are attached on a bottom of the base 611. The plate member 612 having a plate-like shape is arranged on the base 611 so as to close the upper opening of the base 611. In the storage disk drive 60, the housing 61 is formed by joining the plate member 612 to the base 611, wherein the interior space 110 is a clean chamber where dust and debris are extremely slight.

Figure 2:
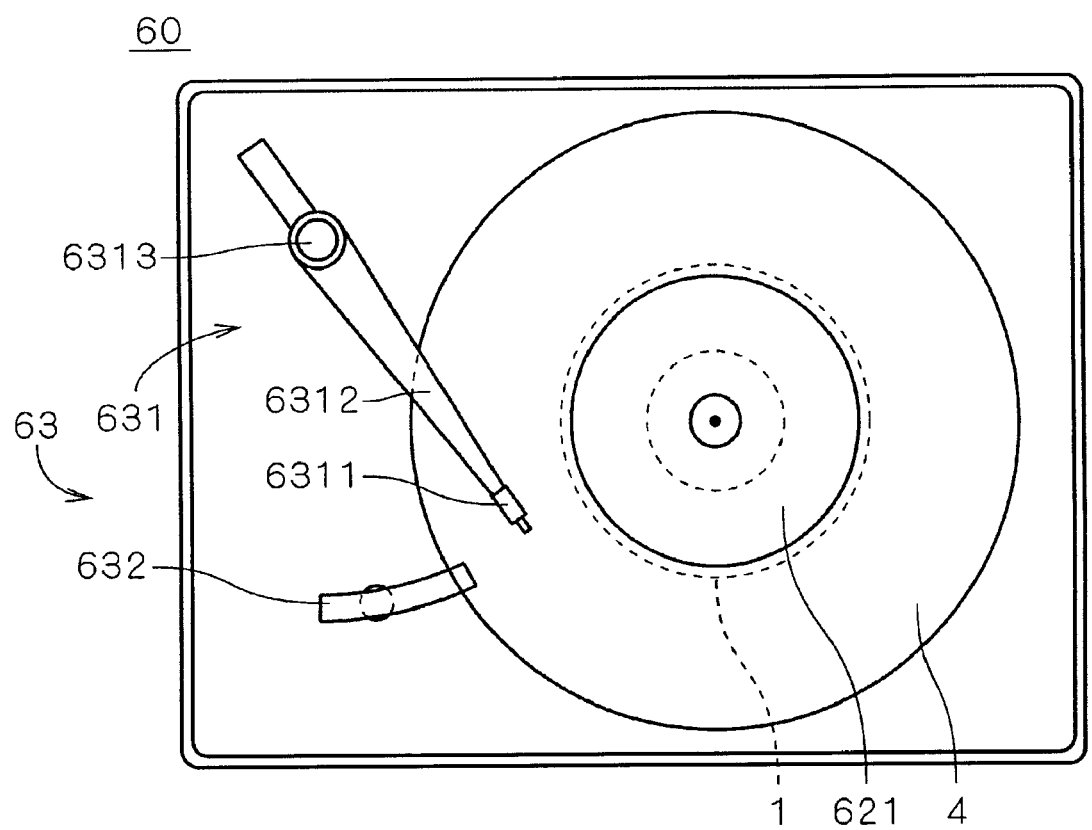
FIG. 2 is a plan view illustrating the storage disk drive.

FIG. 2 is a plan view illustrating the storage disk drive 60. As illustrated in FIGS. 1 and 2, the information storage disk 4 is set onto the motor 1 and the fixed to it by a clamp 621. The access unit 63 includes a head assembly 631 that is adjacent to the storage disk 4 for magnetically writing information onto and reading information from the recording disk 4, and a ramp 632 guiding the head assembly 631 toward the storage disk 4.

As illustrated in FIGS. 1 and 2, the head assembly 631 includes a head 6311 that adjoins the data storage disk 4 for magnetically writing information onto and reading information from the data storage disk 4, an arm 6312 which supports the head 6311, and a head-shifting mechanism 6313 which, by shifting the arm 6312, varies the position of the head 6311 relative to the data storage disk 4. When writing information onto and reading information from the data storage disk 4, the head-shifting mechanism 6313 moves the arm 6312 resting on a ramp 632, and then the arm 6312 is guided along the ramp 632 toward the data storage disk 4 such that the head 6311 is positioned on a required position with adjoining the data storage disk 4 to access a required information.

Figure 3:
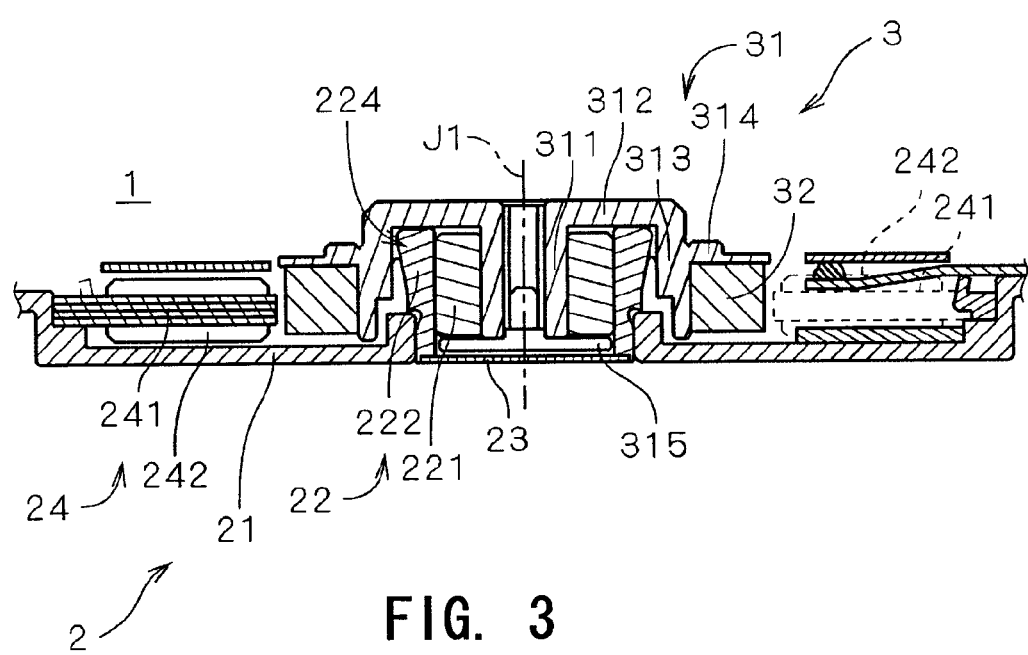
FIG. 3 is a cross sectional view illustrating a motor assembly of the storage disk drive.

FIG. 3 is a cross sectional view illustrating the motor 1 used in the storage disk drive 60 to spin the data storage disk 4. As shown in FIG. 3, the motor 1 is preferably an inner rotor type motor and includes a stator unit 2, a fixed assembly, and a rotor unit 3, a rotatable assembly. The rotor unit 3 is supported via a bearing mechanism preferably using hydrodynamic pressure generate through the use of lubricant oil (hereinafter simply referred to as a hydrodynamic bearing mechanism) such that the rotor unit 3 is rotatable relative to the stator unit 2 around a center axis J1 of the motor 1. For convenience in the following explanation, the rotor unit 3 side of the motor 1 will be described as the upper side and the stator-unit-2 side as the lower end, but the center axis J1 need not necessarily coincide with the direction of gravity.

The stator unit 2 includes a base plate 21 defining a part of the base 611 which retains the different parts defining the stator unit 2, a cylindroid sleeve unit 22 which constitutes the bearing mechanism rotatably supporting the rotor unit 3, and an armature 24 supported by the base 611 at radially outside of the sleeve unit 22. The lower portion of the sleeve 22 is press-fitted into an opening of the baseplate 21, and the opening along the lower end of the sleeve unit 22 is closed over by a discoid sealing cap 23.

The sleeve unit 22 includes a sleeve 221 having a substantially cylindrical sleeve 221, into which the shaft 311 is inserted, centering on the center axis J1, and a cylindroid sleeve housing 222 attached to the outer periphery of the sleeve 221. The sleeve 221 is preferably made of porous material, and the sleeve housing 222 holds the lubricant oil with which the sleeve 221 is impregnated. The armature 24 includes a core 241 preferably constructed by laminating a plurality of silicon steel plates and a plurality of coils 242 defined by wires wound around a plurality of teeth provided on the core 241.

The rotor unit 3 includes a rotor hub 31 retaining the different parts defining the rotor unit 3, and a field magnet 32, encircling the center axis J1, attached to the rotor hub 31. The field magnet 32 preferably is a circular multipolar magnet and generates rotation force (torque) centered about the center axis J1 between itself and the armature 24.

The rotor hub 31 is preferably formed unitarily from stainless steel or other suitable metal and includes the cylindrical shaft 311 which extends downward (i.e., toward the stator unit 2), and centered about the center axis J1; a discoid convex portion 312, which extends substantially perpendicularly with respect to the center axis J1, from the upper end portion of the shaft 311; a substantially cylindrical portion 313 which extends downward along the rim of the convex portion 312; and a disk placing portion 314 on which the recording disk 4 is placed and that extends outward from the outer surface of the cylindrical portion 313. A substantially discoid thrust plate 315 is attached to a bottom tip-end portion of the shaft 311.

As illustrated in FIG. 3, micro-gaps are provided in the motor 1 between a lower surface of the convex portion 312 of the rotor hub 31 and an upper end surface of the sleeve housing 222; between the inner-side surface of the sleeve 221 and the outer-side surface of the shaft 311; between a lower end surface of the sleeve 221 and an upper surface of the thrust plate 315; between a lower surface of the thrust plate 315 and an upper surface of the sealing cap 23; and between an outer-side surface of a flange portion 224, an upper portion of the sleeve housing 222, and an inner-side surface of the cylindrical section 313 of the rotor hub 31.

The lubricating oil completely and continuously fills the micro-gaps between the rotor hub 31, sleeve unit 22, and the sealing cap 23 without interruption, whereby a fully filled bearing mechanism is provided. In the motor 1, the fact that the rotor portion 3 is supported in a non-contact manner, via the lubricating oil, by the hydrodynamic-pressure-using bearing mechanism enables the recording disk 4 (see FIG. 1), attached to the rotor portion 3, to spin with high precision and low noise.

Figure 4:
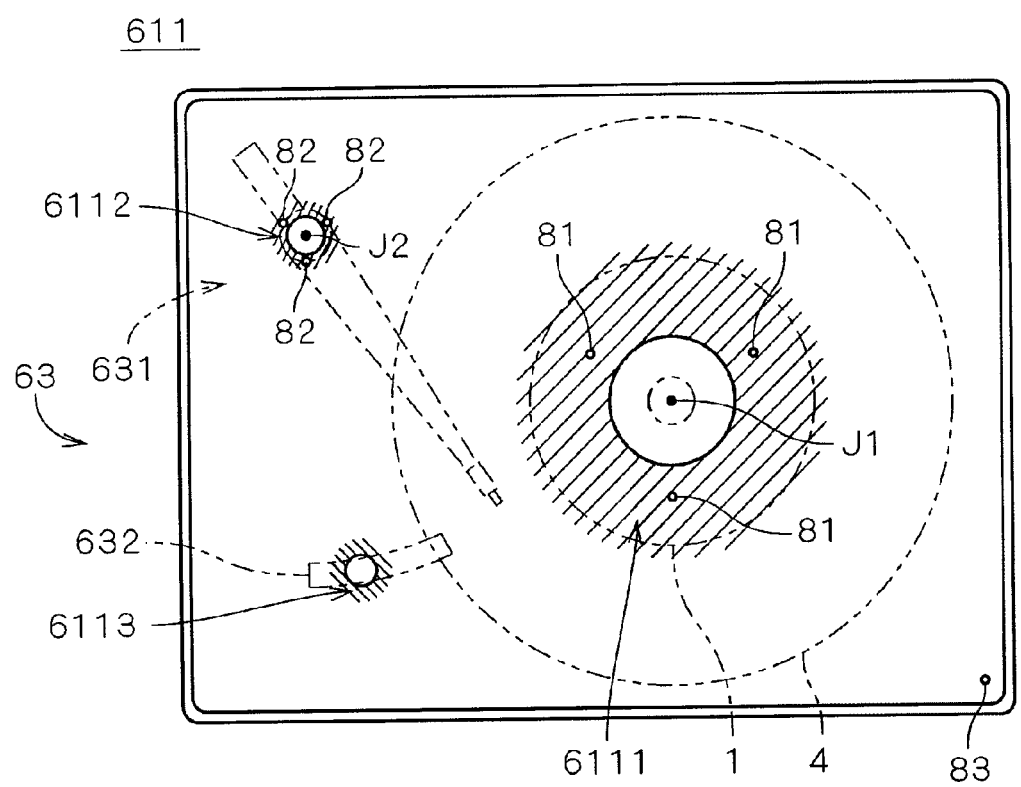
FIG. 4 is a plan view illustrating a base of the motor assembly.

FIG. 4 is a plan view illustrating the base 611 which supports the motor 1 and the access unit 63. In FIG. 4, the data storage disk 62, arranged on the motor 1, and the access unit 63 are illustrated with two-dot chain lines.

As illustrated in FIG. 4, the base 611 includes a motor placing portion 6111 at which the sleeve unit 22 of the motor 1 is arranged, a head assembly placing portion 6112 at which the head assembly 631 is arranged, and a ramp placing portion 6113 at which the ramp 632 is arranged. For convenience in the following description, the head assembly placing portion 6112 and the ramp placing portion 6113 together are simply referred to as the access unit placing portion. In the storage disk drive 60, since the data storage disk 4 is indirectly supported on the motor placing portion 6111 via the motor 1, the motor placing portion 6111 will be recognized as the storage disk placing portion.

Next, manufacturing method of the motor assembly of the storage disk drive 60 will be described. In the preferred embodiments of the present invention, the motor assembly may be referred to as the base 611 of the housing 61 for purposes of describing the manufacturing process. It should be noted, however, the motor assembly may include other members defining the storage disk drive 60. In addition, the motor assembly preferably includes at least one of the motor placing portion 6111, the head assembly placing portion 6112, and the ramp placing portion 6113.

Figure 5:
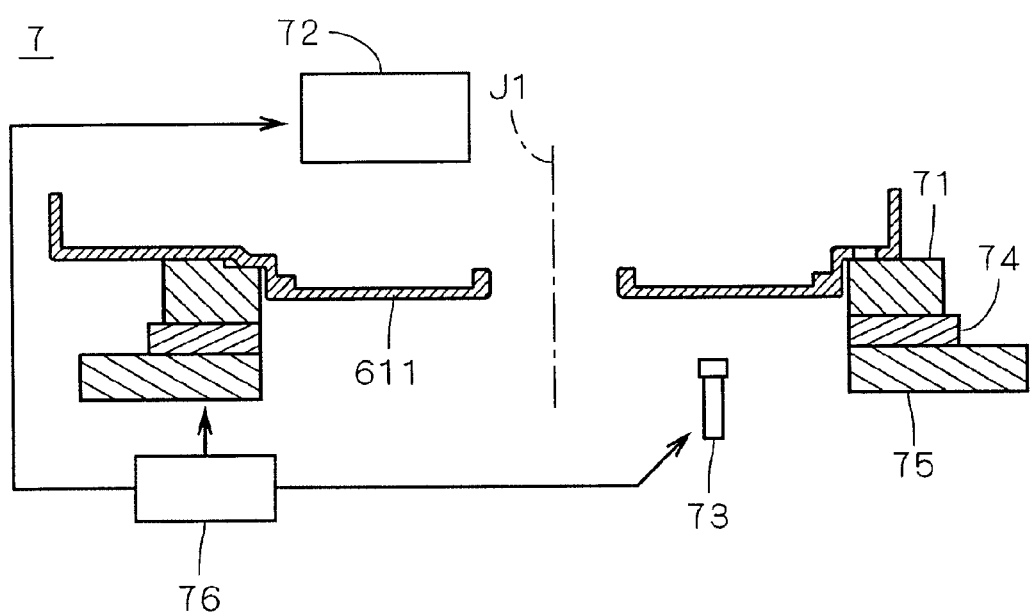
FIG. 5 is a drawing illustrating a configuration of a manufacturing device of the motor assembly.

FIG. 5 is a cross sectional view schematically illustrating a configuration of a part of a manufacturing device 7 of the motor assembly.

As illustrated in FIG. 5, the manufacturing device 7 of the motor assembly includes a supporting table 71 on which the motor assembly (i.e., the base 611 in the present preferred embodiment of the present invention) is placed thereon, a measuring mechanism 72 which measures a distance between itself and a predetermined portion on the motor assembly (i.e., the base 611) along the center axis, a heating mechanism 73 which applies heat to the base 611 supported on the supporting table 71, a rotary mechanism 74 which rotates the supporting table 71 and the base 611 supported thereon, a shifting mechanism 75 which moves the supporting table 71 relative to the heating mechanism 73, a control unit 76 which controls these mechanisms.

In the manufacturing device 7, as illustrated in FIG. 5, the base 611 is placed on the supporting table 71. The measuring mechanism 72 is arranged upward of an upper side surface of the base 611, wherein the motor 1 and the access unit 63 are to be arranged on the upper side surface. Hereinafter, the upper side surface of the base 611 on which the motor 1 and the access unit 63 are to be arranged is referred to as a mounting surface, and the lower side surface of the base 611 is referred to as an exterior surface. In the present preferred embodiment of the present invention, the measuring mechanism 72 is preferably a range sensor (e.g., a laser displacement gauge, an auto-collimator, and the like) which measures the distance between itself and the predetermined point of the surface of the base 611 in a non-contact manner.

The heating mechanism is arranged downward of the supporting table 71 (i.e., downward of the exterior surface of the base 611) and includes an radiating source radiating a portion of the base 611 with an energy beam (i.e., a pulse laser beam and the like) to heat the portion of the base 611. The shifting mechanism 75 is a so-called XY table which moves the supporting table 71 and the base 611 arranged thereon in an X direction and a Y direction, substantially perpendicular each other and both of which are substantially parallel to the mounting surface and the exterior surface of the base 611.

As illustrated in FIG. 4, in the mounting surface of the base 611, three first datum points 81 are arranged at the motor placing portion 6111, and three second datum points 82 are preferably arranged at the access unit placing portion. The three first datum points 81 are preferably arranged on a circle centered about the center axis J1 and equally separated in a circumferential direction. The three second datum points 82 are preferably equally spaced in a circumferential direction of a circle centered about a pivot axis J2 of the head assembly placing portion 6112, wherein the pivot axis is a center axis of the pivotal movement of the head 6311 and the arm 6312. In addition, a third datum point 83 for the motor placing portion 6111 is arranged on the mounting surface of the base 611, apart from a later-described target area of the base 611.

In the manufacturing device 7 of the motor assembly illustrated in FIG. 5, the shifting mechanism 75 moves the base 611 relative to the measuring mechanism 72, and then the measuring mechanism 72 subsequently detects the distances along the center axis J1 of the motor placing portion 6111 between itself and the first datum points 81, between itself and the second datum points 82, and between itself and the third datum point 83. Then, the distances between each of the first datum points 81 and the third datum point 83, and the distances between each of the second datum points 82 and the third datum point 83 are calculated, and thus, a positional relationship of the first datum points 81 and the second datum points 82 relative to each other is determined. In the present preferred embodiment of the present invention, the axial height difference between the first datum points 81 and the second datum points 82 are calculated.

Figure 6:
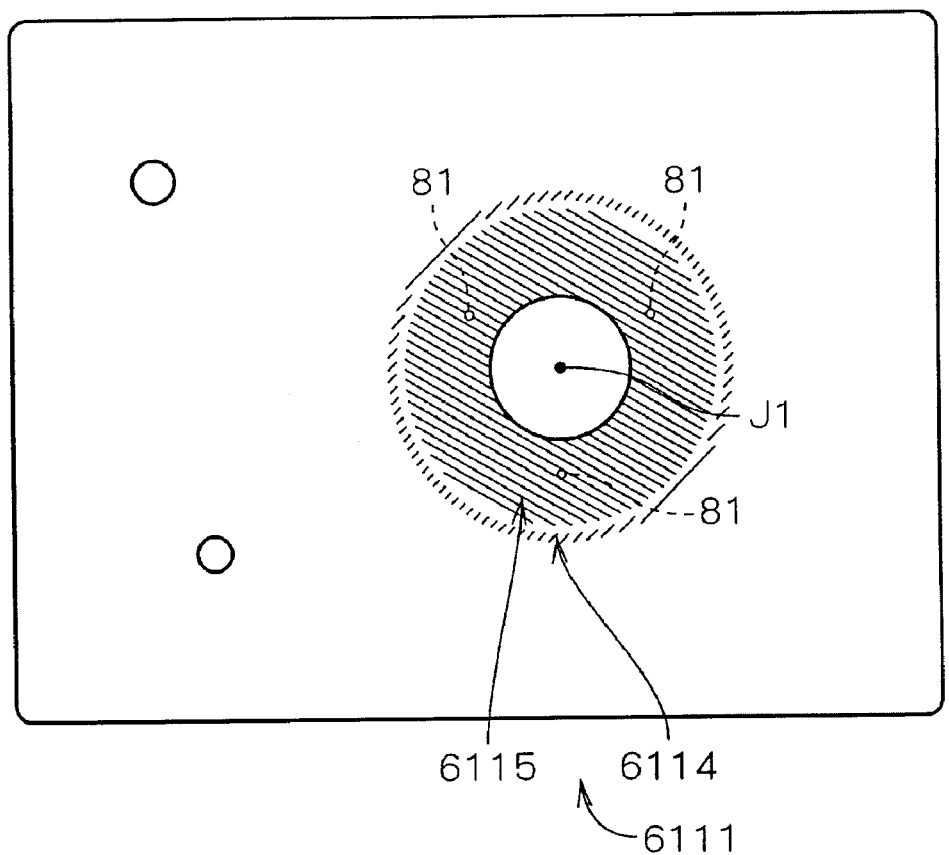
FIG. 6 is a bottom plan view illustrating the base of the motor assembly.

FIG. 6 is a bottom plan view illustrating the base 611. In the manufacturing device 7 of the motor assembly, the rotary mechanism 74 (see FIG. 5) rotates the base 611 supported on the supporting table 71 at a constant speed with the center axis J1 as center. Then, the energy beam (i.e., a pulse laser beam) is radiated to a predetermined area (i.e., a target area) on the exterior surface of the base 611 while the supporting table 71 and the base 611 arranged thereon is rotated.

In the present preferred embodiment of the present invention, the radiation source radiating the energy beam is stationary and arranged below the exterior surface of the base 611, and the base 611 is rotated centered about the center axis J1 while the energy beam is radiated to the base 611. Thus, the area to which the energy beam is radiated has a configuration that is centered about the center axis J1. For example, the area may have a circular shape centered about the center axis J1, an arc shape centered about the center axis J1, and the like.

Through the abovementioned steps, the energy beam is radiated to the target area 6114 on the motor placing portion 6111 illustrated in FIG. 6 such that heat is applied to the target area 6114 of the base 611. In the present preferred embodiment of the present invention, a pulse laser beam is radiated to the target area 6114, and thus, heat is subsequently applied to a plurality of small spots (each of the spots preferably has a substantially circular area having an approximate diameter of 0.5 mm) to which each pulse of the laser beam is radiated, and which define the target area 6114. In the present preferred embodiment of the present invention, the target area 6114 is preferably a substantially circular area centered about the center axis J1, and the energy beam is radiated to the target area 6114 while the base 611 is rotated one revolution.

Figure 7:
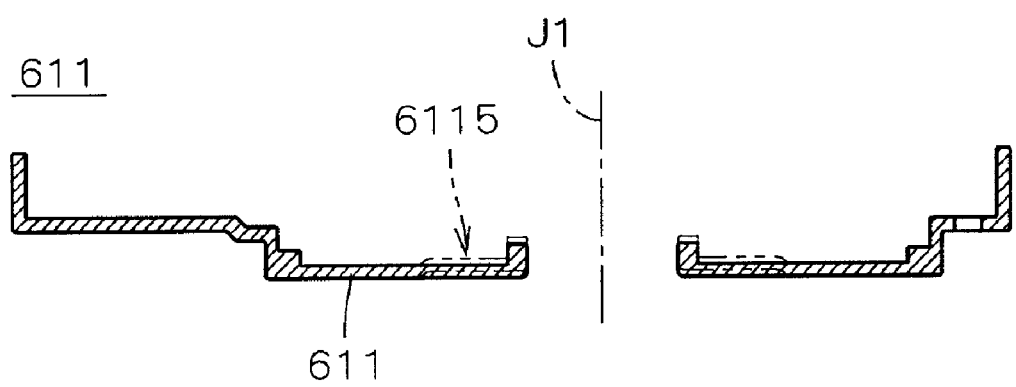
FIG. 7 is a vertical sectional view illustrating the base of the motor assembly.

FIG. 7 is a vertical sectional view illustrating the base 611. In the base 611 illustrated in FIG. 6, the base 611 is firstly deformed at and around the target area 6114 by heating the target area 6114 on the exterior surface of the base 611 such that a portion of the base 611 is melted and thermally expands at and around the target area 6114. In the preferred embodiment of the present invention, a radially outside portion of the base 611 is supported on the supporting table 71, thus, the target area 6114 is displaced toward the axially lower direction in terms of the radially outside portion. Then, the target area 6114 thermally shrinks as the target area 6114 is cooled off, and the target area 6114 is displaced toward the axially lower direction in terms of the radially outside portion of the base 611. As described above, a flat portion 6115 of the base 611, surrounded with the target area 6114, is displaced toward the axially upper direction as illustrated by the double dot lines in FIG. 7. In the following description, the flat portion 6115 on the motor placing portion 6111 is referred to as a displacement portion 6115. In the present preferred embodiment of the present invention, the first datum points 81 are arranged on the displacement portion 6115 of the base 611 as illustrated in FIG. 6, and the first datum points 81 and the displacement portion 6115 is displaced toward the axially upper direction by heating the target area 6114 arranged radially outer circumference of the displacement portion 6115 of the base 611 from the axially lower side thereof.

Figure 8:
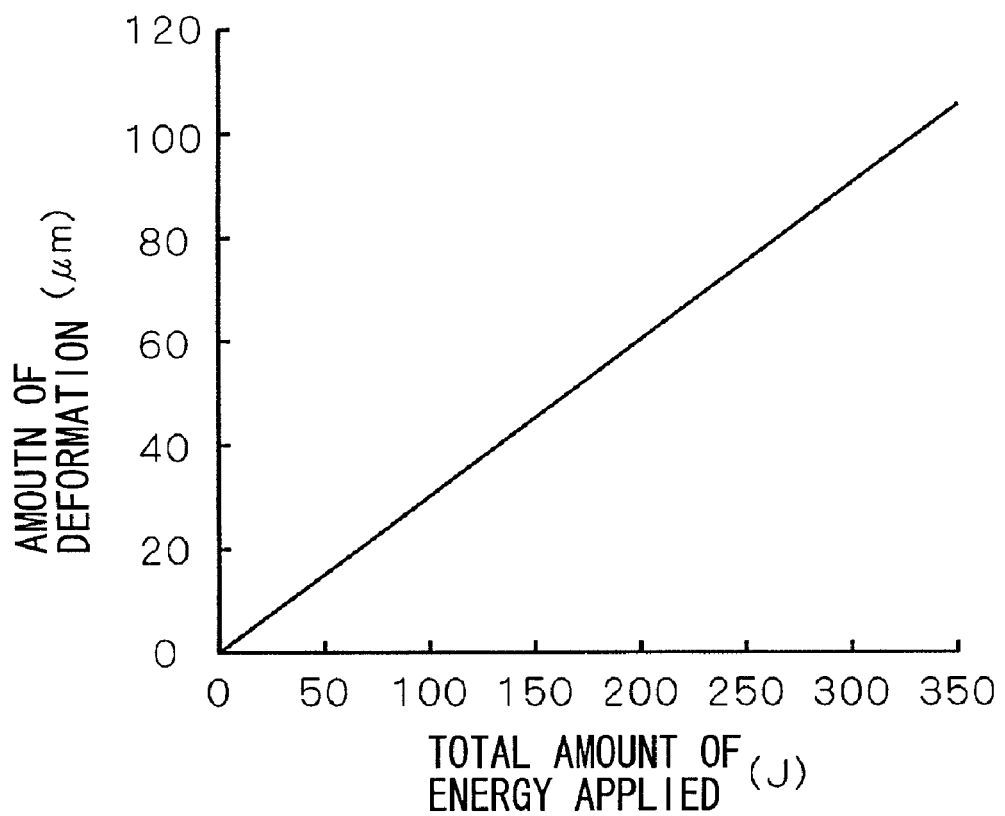
FIG. 8 is a drawing illustrating a relationship between an amount of energy applied to the base and an amount of deformation of the base.

In the manufacturing device 7 of the motor assembly illustrated in FIG. 5, an amount of a deformation of the displacement portion 6115 is adjusted by controlling a total amount of energy applied to the target area 6114 of the base 611 from the heating mechanism 73. FIG. 8 is a graph illustrates a relationship between the total amount of energy applied to the target area 6114 and the amount of deformation of displacement portion 6115. As illustrated in FIG. 8, the amount of deformation of displacement portion 6115 is in direct proportion to the total amount of energy applied to the target area 6114.

In the foregoing description of the present preferred embodiment of the present invention, the displacement portion 6115 of the base 611 is preferably displaced toward the axially lower direction by applying heat to the target area 6114 from the axially lower side thereof. It should be noted, however, the displacement portion 6115 may be displaced toward the axially upper direction. In that case, the base 611 is placed on the supporting table 71 in an upside-down manner from the foregoing description, and then the heat is applied to the target area 6115 arranged on the mounting surface by radiating the energy beam thereto, such that the displacement portion 6115 of the base 611 is displaced toward the lower-surface-side direction of the base 611.

Figure 9:
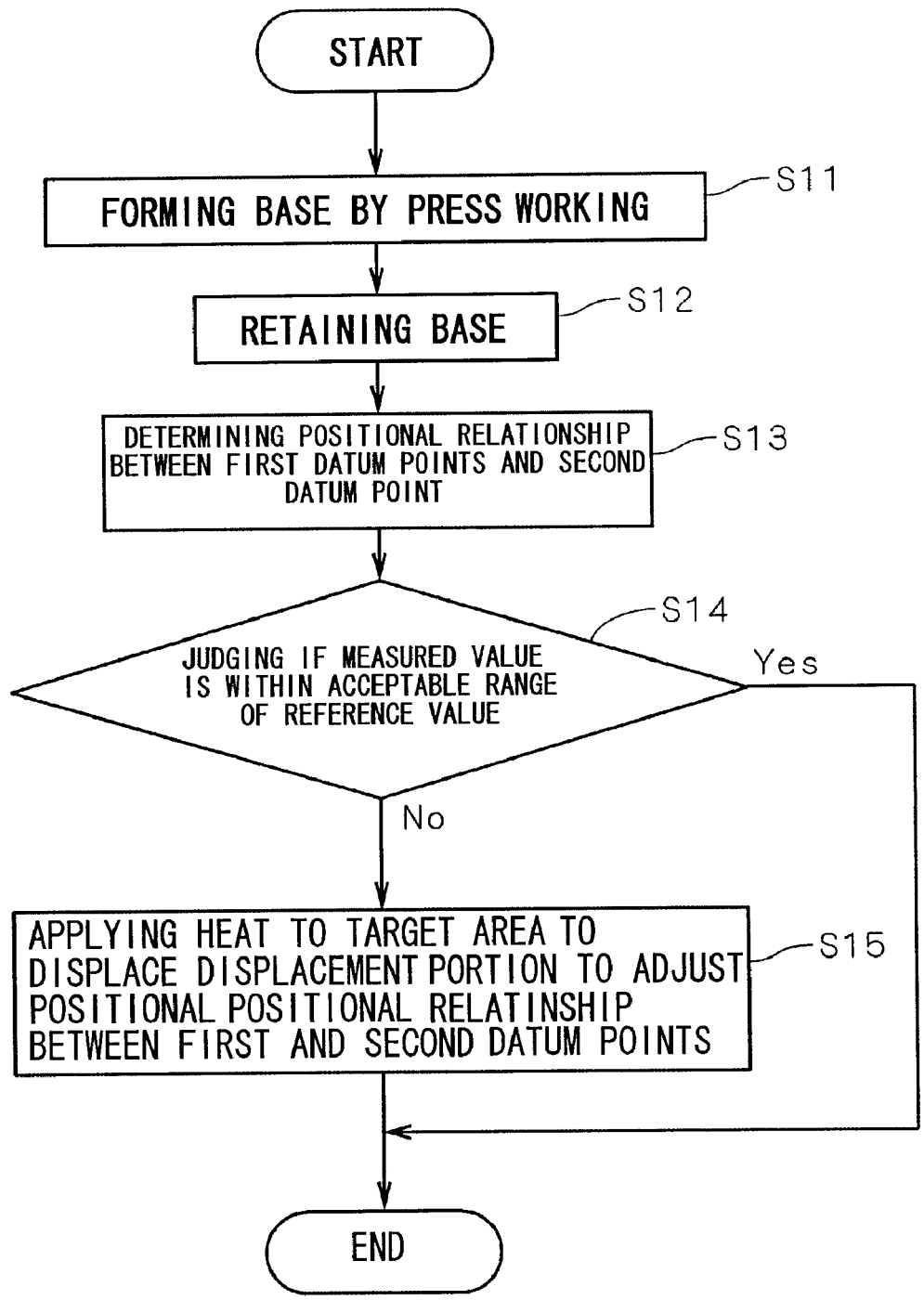
FIG. 9 is a chart setting forth process flow in the manufacture of the motor assembly.

FIG. 9 is a chart setting forth process flow of the manufacturing method of the motor assembly according to the present preferred embodiment of the present invention. In the manufacturing method of the motor assembly, a plate material made of metallic material (e.g., a stainless metal material) is pressed by a pressing machine and the base 611 having the motor placing portion 6111 and the access unit placing portion (defined by the head assembly placing portion 6112 and the ramp placing portion 6113) is manufactured (a step S11).

Next, the base 611 is placed on the supporting table 71 of the manufacturing device 7 of the motor assembly illustrated in FIG. 5 (a step S12). Then, the measuring mechanism 72 of the manufacturing device 7 determines the positional relationship (i.e., the axial height difference) between the first datum points 81 arranged around the motor placing portion 6111 and the second datum points 82 arranged around the head assembly placing portion 6112 (a step S13).

Next, the measuring mechanism 72 sends to the control unit 76 a measured value of positional relationship between the first datum points 81 and the second datum points 82, and the control unit 76 compares the measured value with the reference value (i.e., design value) stored thereon (a step S14). When the measured value is in an acceptable range of the reference value, manufacturing of the base 611 is finished.

When the measured value is outside of an acceptable range of the reference value, the positional relationship between the first datum points 81 and the second datum points 82 is adjusted. More specifically, firstly by using the shifting mechanism 75 which moves the supporting table relative to the heating mechanism 73, the supporting table 71 and the base 611 are moved above the heating mechanism 73. Then, based on the comparison between the measured value and the reference value (i.e., a degree of a positional difference relative to each other), the control unit 76 determines a parameter to radiate the energy beam to the base 611. In the present preferred embodiment of the present invention, a pulse YAG laser beam is preferably radiated to the target area 6114 of the base rotating in a substantially constant speed for applying heat to the target area 6114, and the parameter determined by the control unit 76 is a pulse number of the pulse laser beam per unit time, while a spot radius, a peak power, a pulse width (i.e., a length of time of each pulse of the energy beam), and a pulse pitch (i.e., a time interval of each pulse of the energy beam) are kept substantially constant. By configuring the pulse number of the pulse laser beam, the total amount of energy applied to the target area 6114 is determined.

As described above, the base 611 is rotated centered about the center axis J1 by the rotary mechanism 74, and the pulse laser beam is radiated from the heating mechanism 73 to the target area 6114 arranged on the motor placing portion 6111. In the present preferred embodiment of the present invention, the pulse laser beam is radiated to the base 611 while the base 611 is rotated for one revolution. Through the step described above, the displacement portion 6115 of base 611 are displaced to the axially upper direction along the center axis J1 (i.e., toward the opposite side being heated) such that the positional relationship between the first datum points 81 and the second datum points 82 is adjusted within the acceptable range of the reference value (a step S15).

The positional relationship between the first datum points 81 and the second datum points 82 may be determined again after the positional relationship thereof is adjusted. When the measured value is out of the acceptable range of the reference value, the heat is again applied to the target area 6114 to re-adjust the positional relationship between the first datum points 81 and the second datum points 82.

Next, the motor 1, the head assembly 631, and the ramp 632 are mounted on the motor placing portion 6111, the head assembly placing portion 6112, and the ramp placing portion 6113 respectively. Then, as illustrated in FIG. 1, the data storage disk 4 is mounted to the motor 1 and plate member 612 is mounted to the base 611 to complete manufacturing of the storage disk drive 60.

As described above, in the manufacturing method of the motor assembly (i.e., the base 611) of the storage disk drive 60 according to the present preferred embodiment of the present invention, the positional relationship between the first datum points 81 on the motor placing portion 6111 and the second datum points 82 on the head assembly placing portion 6112 is determined, and the displacement portion 6115 of the motor placing portion 6111 is displaced by applying the heat to the target area 6114 based on the parameters configured by the comparison of the measured value and the reference value.

When the displacement portion 6115 of the base is displaced by simply pressing the displacement portion 6115, it is difficult to deform the base 611 in a precise manner because of the elastic recovery of the base 611.

In manufacturing of the motor assembly according to the present preferred embodiment of the present invention, the displacement portion 6115 of the base 611 is displaced by applying heat around the displacement portion 6115, the degree of deformation of the base is precisely controlled, allowing for precise control of the positional relationship between the first datum points 81 and the second datum points 82 along the center axis J1 (i.e., a positional relationship between the motor placing portion 6111 and the head assembly placing portion 6112 may be highly precisely adjusted).

Through the steps described above, the relative position of the heat assembly 631 relative to the motor 1 is easily adjusted within the acceptable range. With a preferable positional relationship between the heat assembly 631 and the motor 1, it is possible to prevent an access error of the heat 6311 in the data storage disk 4.

The manufacturing method of the motor assembly according to the present preferred embodiment of the present invention may be preferably applicable to the motor assembly whose base 611 is formed by pressing. Generally, the press working is less costly compared with a cutting process but it is difficult to maintain the machining accuracy in the press working compared with cutting work. In the manufacturing method according to the present preferred embodiment of the present invention provides, however, the machining accuracy of the motor assembly is highly precisely adjustable, enabling manufacture of the motor assembly having a high machining accuracy with a low manufacturing cost. It should be noted, however, that the method according to the present preferred embodiment of the present invention may be preferably applied to the motor assembly having a base 611 formed by a cutting process. In that case, the base 611 is formed by the cutting process in the step S11 described above.

In the manufacturing method of the motor assembly according to the present preferred embodiment of the present invention, the heat is applied to the target area 6114 from the lower side of the base 611 (i.e., toward the exterior surface of the base 611). Through the configuration, it is possible to prevent particles (e.g., fumes generated by applying heat to the base 611) from being attached to the mounting surface of the base 611, enabling maintenance of a preferable cleanliness of the interior space 610 of the storage disk 60.

In the present preferred embodiment of the present invention, the heat is applied to the target area 6114 preferably by radiating the pulse YAG laser beam, having a high directivity, enabling to apply heat to the target area 6114 in a highly precise manner. Thus, the present preferred embodiment of the present invention is preferably applicable to manufacturing of the small precision motor requiring high machining accuracy. From the viewpoint of applying the heat to the target area 6114 in a precise manner, other energy beams (e.g., other laser beams such as $CO_2$ laser and electron beam) may be radiated from the heating mechanism 73 to apply the heat to the target area 6114 of the base 611.

In the present preferred embodiment of the present invention, the heat is applied to the target area 6114 arranged around the displacement portion 6115 with the pulse laser beam. Thus, the target area 6114 is defined by a plurality of small areas continuously arranged around the displacement portion 6115. It should be noted, however, the target area 6114 may be defined by a plurality of small areas separately arranged around the displacement portion 6115 by making the rotational speed of the base 611 faster and the pulse width of the pulse laser beam wider.

As described above, in the manufacturing device 7 of the motor assembly, by configuring a pulse number of the laser beam per unit time, the total amount of energy applied to the target area 6114 is adjusted, enabling control of the amount of deformation of the base 611. It should be noted, however, other parameters such as the spot radius, the peak power, the pulse width, the pulse pitch, a total radiation time of the energy beam, the rotational speed of the motor assembly and the like may be adjusted to control the amount of deformation of the base 611. In addition, the laser beam may be radiated while the base 611 is rotated for more than one revolution to adjust the total amount of energy applied to the target area 6114 of the base 611.

The energy beam radiated from the heating mechanism 73 to the target area 6114 may be a continuous laser beam. In this case, by controlling the rotational speed of the base 611, the total amount of energy the continuous laser beam applied to the target area 6114 may be adjusted. For example, by slowing down the rotational speed of the base 611, the energy the continuous laser beam applied to the target area 6114 is increased.

It is also possible to control by the control unit 76 the energy per unit time of the laser beam to adjust the amount of deformation of the displacement portion 6115. Meanwhile, by making the energy per unit time of the laser beam smaller, it is possible to deform the base 611 to a lesser degree without melting the target area 6114 of the base 6114. In this case, since the base 611 is not melted at the target area 6114, it is possible to deform the base 611 without degrading the appearance of the base 611. Especially, when plating or coating is applied to an exterior of the base 611, it is preferable that the base 611 is deformed without degrading the exterior of the base 611.

The amount of deformation of the displacement portion may be adjusted by controlling a shape and/or a position of the target area 6114 with use of the control unit 76. For example, by configuring the spot radius of the energy beam radiated from the heating mechanism 73, the width of the target area 6114 may be adjusted.

The target area 6114 may include a plurality of circular or substantially circular areas centered about the center axis J1. For example, the energy beam is radiated to the first circular area centered about the center axis J1 in one revolution of the base 611, and then, the energy beam is radiated to second circular area centered about the center axis J1 and having a different radius from the first virtual area. In this case, the target area 6114 includes a plurality of circular areas radially separated each other. Meanwhile, a method of adjusting the total amount of energy to the target area 6114 may be applied to after-mentioned preferred embodiments of the present invention.

In the present preferred embodiment of the present invention, the displacement portion 6115 is preferably arranged at the motor placing portion 6111 of the base 611. It should be noted, however, the displacement portion may be arranged at the access unit placing portion. For example, the first datum points are preferably arranged around the head assembly placing portion 6112, and the second datum points are preferably arranged at the motor placing portion 6111. In this case, the energy beam is radiated to the base 611 rotated by the rotary mechanism 74 with the pivot axis J2 as center, and thus, the heat is applied to the target area 6114 centered about the pivot axis J2 arranged around the head assembly placing portion 6112. Through the configuration, the displacement portion (e.g., the heat assembly placing portion 6112) is displaced to the axially upper direction (i.e., opposite direction from the direction the energy beam is radiated) such that the position of the motor placing portion 6111 relative to the head assembly placing portion 6112 is adjusted in a highly precise manner. Thus, the position of the data storage disk 4 attached to the motor 1 relative to the head 6311 is adjusted in a precise manner, preventing the access error in the storage disk drive 60.

Alternatively, the displacement portion and the first datum points may be arranged at the ramp placing portion 6113, and the second datum points 82 may be arranged at the motor placing portion 6111. In this case as well, the energy beam is radiated the target area 6114 arranged around the ramp placing portion 6113. Through the configuration, the position of the motor placing portion 6111 relative to the ramp placing portion 6113 is adjusted in a precise manner. Thus, the head 632 is precisely guided over the data storage disk 4 attached to the motor 1, preventing the access error in the storage disk drive 60.

In the present preferred embodiment of the present invention, the target area may be arranged around the head assembly placing portion 6112, and the other target area may be arranged around the ramp placing portion 6113. In this case, the heat is applied to each of the target areas, and the base 611 is displaced at each of the target areas along the center axis J1 respectively. Alternatively, the target areas may be arranged around the head assembly placing portion 6112 and/or the ramp placing portion 6113, and around the motor placing portion 6111. By deforming the base at each of the target areas along the center axis J1, the position of the motor placing portion 6111 relative to the access unit placing portion may be highly precisely adjusted.

Next, a manufacturing method of the motor assembly of the storage disk drive 60 according to the second preferred embodiment of the present invention will be described in detail. The motor assembly (i.e., the base 611) preferably has a configuration that is substantially the same as that described in the foregoing description and FIGS. 4 and 6, and labeled with the same reference numerals in the description that follows.

Figure 10:
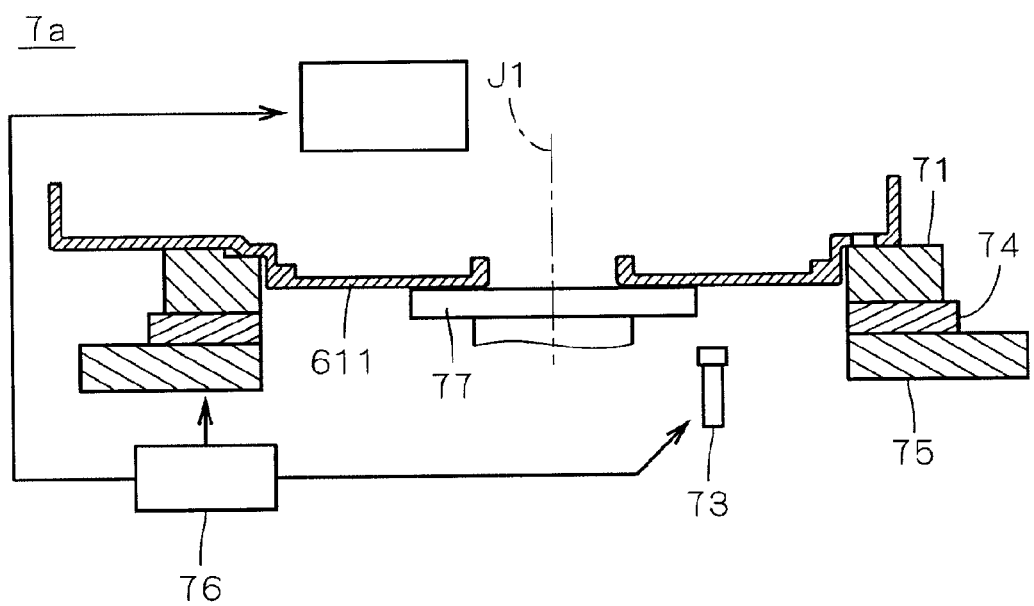
FIG. 10 is a cross sectional view illustrating a configuration of a manufacturing device of the motor assembly according to a second preferred embodiment of the present invention.

FIG. 10 is a cross sectional view illustrating a configuration of a manufacturing device 7a of the motor assembly according to the second preferred embodiment of the present invention. The manufacturing device 7a of the motor assembly includes a pressing mechanism 77 which presses a predetermined portion of the base 611. The rest of the configuration of the manufacturing device 7a is preferably the same as that illustrated in FIG. 5. The process flow in the manufacture of the motor assembly according to the second preferred embodiment of the present invention is substantially the same as that described in the foregoing description. In the manufacturing device 7a, the pressing mechanism 77 is turned centering on the center axis J1 by the rotary mechanism 74, wherein the pressing mechanism 77 is turned while keeping the relative position between the supporting table 71 and the base 611 placed on the supporting table 71.

In the second preferred embodiment of the present invention, while the rotary mechanism 74 turns the supporting table 71, the base 611, and the pressing mechanism 77, the pressing mechanism 77 having a cylindrical column shape axially upwardly presses the exterior surface at the deforming portion 6115 of the base 611 supported on the supporting table 71 (see FIG. 6). With pressing the base 611, the energy beam is radiated from the heating mechanism 73 to the target area 6114, and the displacement portion 6115 is displaced to the axially upper direction along the center axis J1.

By pressing the displacement portion 6115 while radiating the energy beam toward the target area 6114, the amount of deformation of the base 611 may be enlarged without increasing the total amount of energy applied to the target area 6114 compared with the first preferred embodiment of the present invention, in which the base 611 is deformed without pressing the base 611. In other words, according to the second preferred embodiment of the present invention, the positional relationship between the first datum points 81 and the second datum points 82 along the center axis J1 may be adjusted in an efficient manner.

In the second preferred embodiment of the present invention, the pressing mechanism 77 may have a cylindrical or substantially cylindrical shape having a greater inner diameter than the outer diameter of the target area 6114. In this case, the pressing mechanism 77 presses the base 611 around the target area 6114 from the side opposite of that the energy beam is radiated. With this configuration, the positions of the first datum points 81 relative to the second datum points 82 along the center axis J1 may be highly precisely adjusted in an efficient manner.

Next, a method of manufacturing a motor assembly according to the third preferred embodiment of the present invention will be described. In the present preferred embodiment of the present invention, the configuration of the storage disk drive 60 is substantially the same as that illustrated in FIGS. 1, 4, and 6, and is labeled with the same reference numerals in the description that follows.

Figure 11:
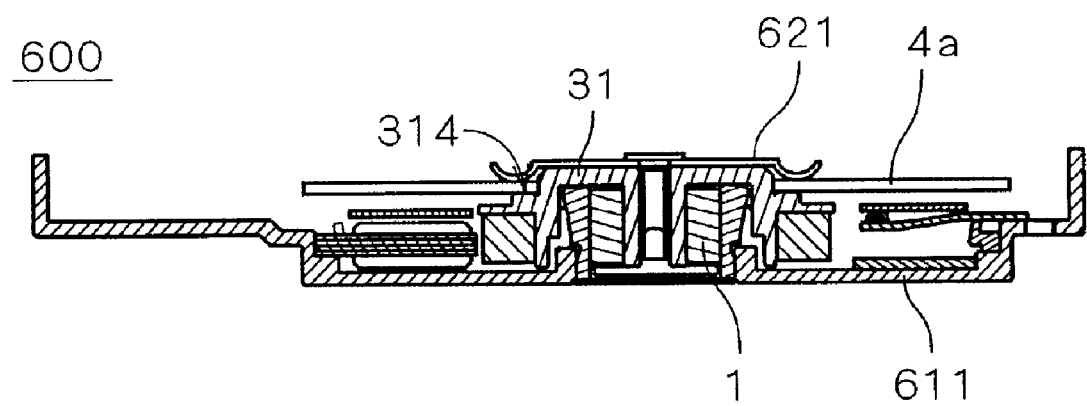
FIG. 11 is a drawing illustrating an internal configuration of a motor assembly according to a third preferred embodiment of the present invention.
Figure 12:
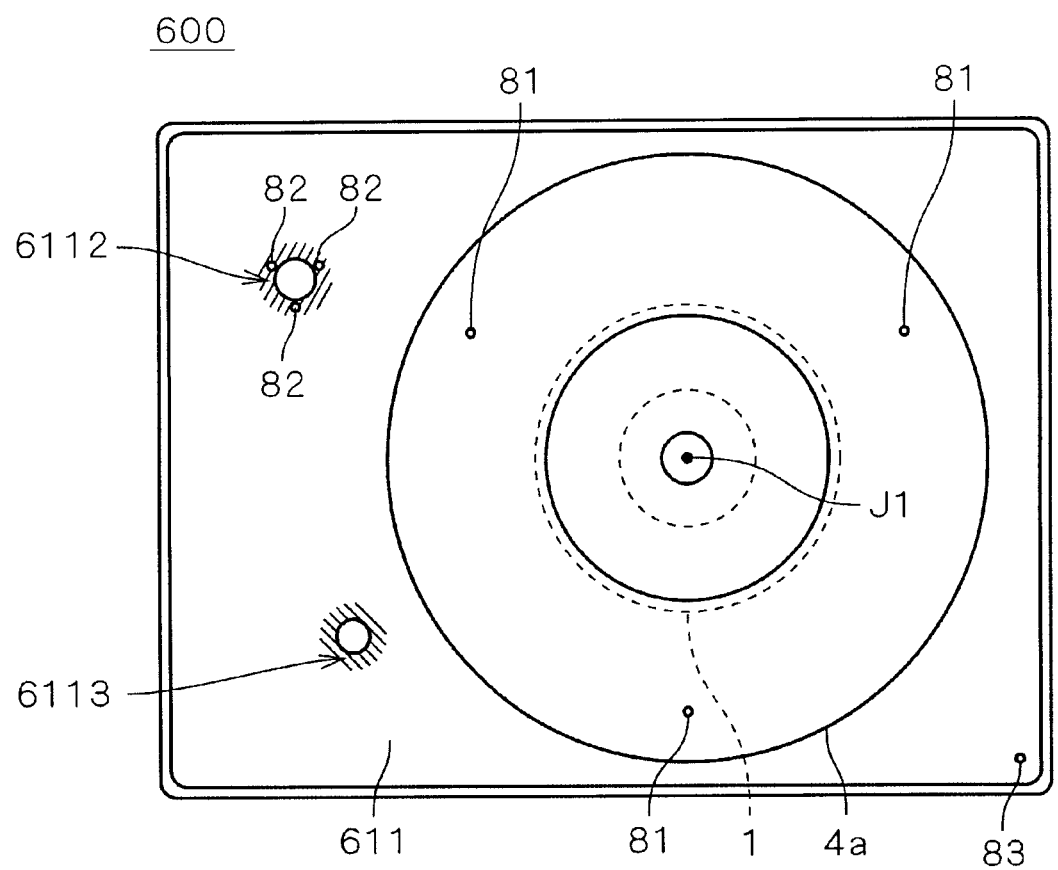
FIG. 12 is a plan view illustrating the motor assembly.

FIG. 11 is a cross sectional view illustrating a motor assembly 600 according to the third preferred embodiment of the present invention. FIG. 12 is a plan view of the motor assembly 600. In the third preferred embodiment of the present invention, unlike the first and the second preferred embodiments of the present invention, the motor assembly includes the base 611 and the motor 1 arranged thereon. In FIGS. 11 and 12, a dummy disk 4a and a clamp 621 for securing the dummy disk 4a on the rotor hub 31 are illustrated. In the motor assembly 600, the motor placing portion 6111 and the motor 1 together are referred to as a disk placing portion which supports the data storage disk 4 in the storage disk drive 60.

Figure 13:
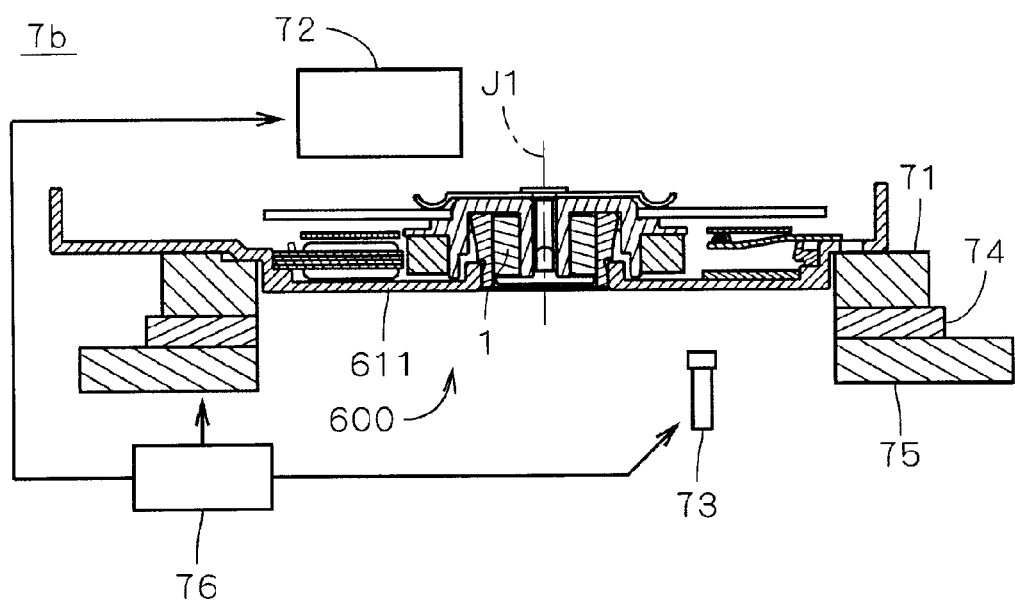
FIG. 13 is a drawing illustrating a configuration of a manufacturing device of the motor assembly.

FIG. 13 is a cross sectional view illustrating a configuration of a manufacturing device 7b used for manufacturing the motor assembly. In the third preferred embodiment of the present invention, the first datum points 81 and the second datum points 82 of which the manufacturing device 7b determines the positional relationship are arranged at positions different from those described in first and the second preferred embodiment of the present invention, and the motor assembly 600 includes the motor 1 arranged at the motor placing portion of the base 611. The rest of the configuration preferably is substantially the same as that of the manufacturing device 7 illustrated in FIG. 5.

Figure 14:
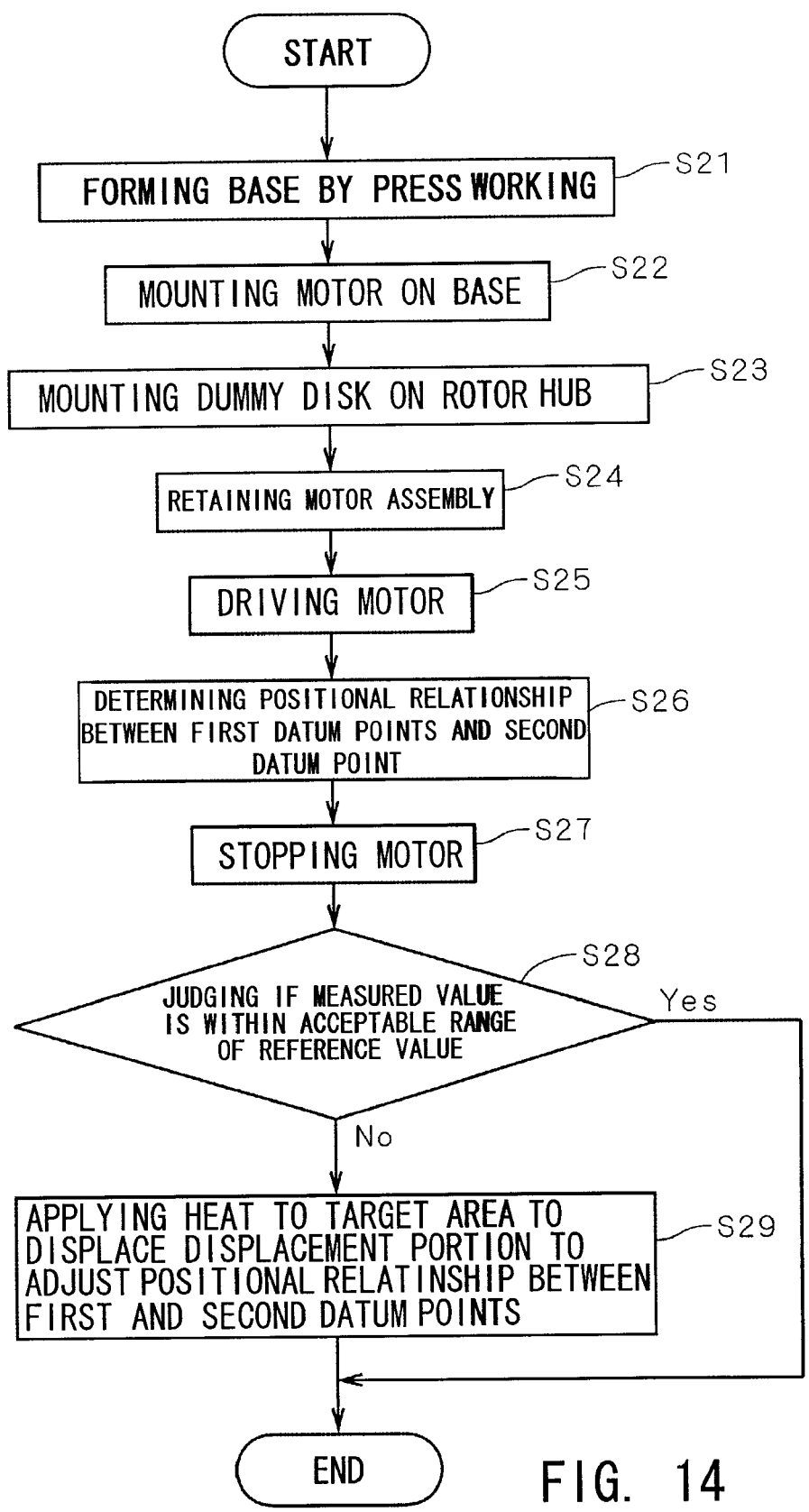
FIG. 14 is a chart setting forth process flow in the manufacture of the motor assembly.

FIG. 14 is a chart setting forth process flow in the manufacture of the motor assembly 600.

In manufacturing of the motor assembly 600, likewise the first preferred embodiment of the present invention, the base 611 is firstly formed by press working (a step S21). Then, the motor 1 is attached to the motor placing portion 6111 of the base 611 as illustrated in FIG. 11 (a step S22). Subsequently, the dummy disk 4a, preferably made of the material substantially the same as the data storage disk 4 and having a shape substantially the same as the data storage disk 4, is mounted and secured on the rotor hub 31 of the motor 1 by using the clamp 621 (a step S23).

Then, as illustrated in FIG. 13, the motor assembly 600 is placed on the supporting table 71 of the manufacturing device 7b. After the motor assembly 600 is placed on the supporting table 71, the dummy disk 4a is rotated by driving the motor 1 at its rated output power (a step S25).

As illustrated in FIG. 12, in the third preferred embodiment of the present invention, the first datum points 81 are arranged on the dummy disk 4a, circumferentially equally separated each other with centering on the center axis J1. In the manufacturing device 7b illustrated in FIG. 13, the shifting mechanism 75 moves the supporting table 71 relative to the measuring mechanism 72 while the motor 1 of the motor assembly 600 spins the dummy disk 4a, and then the measuring mechanism 72 subsequently detects the distances along the center axis J1 between itself and the first datum points 81 on the spinning dummy disk 4a, between itself and the second datum points 82 (see FIG. 12), and between itself and the third datum point 83 (see FIG. 12). Based on the distances, positions of the first datum points 81 relative to the second datum points 82 are calculated (a step S26).

After positional relationship between the first datum points 81 and the second datum points 82 is measured, the rotation of the dummy disk 4a is stopped (a step S27). The measuring mechanism 72 then sends the measured value to the control unit 76, and the control unit 76 compares the measured value with the reference value stored thereon (a step S28). When the measured value is within the acceptable range of the reference value, manufacturing of the motor assembly 600 is finished.

When the measured value is out of acceptable range of the reference value, the parameters of radiating the energy beam to the base 611 is configured based on a difference between the measured value and the reference value such that the positions of the first datum points 81 relative to the second datum points 82 are adjusted. In the present preferred embodiment of the present invention, the motor assembly 600 is rotated centered about the center axis J1 by the rotary mechanism 74, and the energy beam is radiated to the target area 6114 arranged around the motor placing portion 6111 of the exterior surface of the base 611 while the motor assembly 600 is rotated. By radiating the energy beam, positions of the motor 1, the dummy disk 4a, and the first datum points 81 are displaced toward the axially upper direction along the center axis J1 (i.e., toward the direction opposite from the energy-beam radiated side). Through this step, positions of the first datum points 81 relative to the second datum points 82 are adjusted along the center axis J1 such that the positional differences between them are within the reference value, and manufacturing of the motor assembly 600 is finished (a step S29).

Next, the clamp 621 and the dummy disk 4a are detached from the motor 1, and then the head assembly 631 and the ramp 632 (see FIG. 1) are mounted to the head assembly placing portion 6112 and the ramp placing portion 6113 respectively, illustrated in FIG. 12 as shaded portions. In addition, the data storage disk 4 is mounted to the motor 1 and plate member 612 is mounted to the base 611 to complete manufacturing of the storage disk drive 60.

According to the third preferred embodiment of the present invention, similar to the first preferred embodiment of the present invention, the positions of the first datum points 81 relative to the second datum points 82 along the center axis J1 may be highly precisely adjusted by heating and deforming the base 611 at and around the displacement portion 6115. Thus, a positional relationship between the heat assembly 631 and the data storage disk 4 mounted on the motor 1 is preferably maintained, enabling prevention of an access error of the head 6311 in the data storage disk 4.

In the third preferred embodiment of the present invention, since the first datum points 81 are arranged on the dummy disk 4a, the relative position of the first datum points 81 relative to the second datum points 82 is highly precisely adjusted with taking into account the flexure of the rotor hub 31 and the inclination of the disk placing portion 314 upon mounting the data storage disk 4 on the motor 1. In addition, by detecting the relative position of the first datum points 81 relative to the second datum points 82 is measured while the motor 1 is driven, the relative position may be further precisely adjustable with taking into account floating of the rotor hub 1 due to the rotation thereof.

In the view point of preventing the access error of the head 6311, the positional relationship between the data storage disk 4 and the head 6311 may be adjusted on an area at which the heat 6311 is located above the data storage disk 4. Thus, one first datum point 81 may be arranged at the point of the dummy disk 4a corresponding to the point on the data storage disk 4 over which the head 6311 is located, the relative position between one first datum point 81 and the second datum points 82 is preferably adjusted.

Alternatively, the first datum points 81 may be arranged on the disk placing portion 314 of the rotor hub 31, and the positional relationship between the first datum points 81 and the second datum points 82 may be determined while the rotor hub 31 is rotated without mounting the dummy disk 4a thereon. When the dummy disk 4a is not mounted on the motor 1, the flexure of the rotor hub 31 and the inclination of the disk placing portion 314 may be obtained beforehand through the computer simulation and the like, enabling precise adjustment of the positional relationship between the first datum points 81 and the second datum points 82 without mounting the dummy disk 4a on the motor 1.

Next, a method of manufacturing a motor assembly of the data storage disk drive 60 according to the fourth preferred embodiment of the present invention will be described. The storage disk drive 60 according to the fourth preferred embodiment of the present invention has a configuration that is preferably substantially the same as that illustrated in FIGS. 1, 4, and 6, and is labeled with the same reference numerals in the description that follows.

Figure 15:
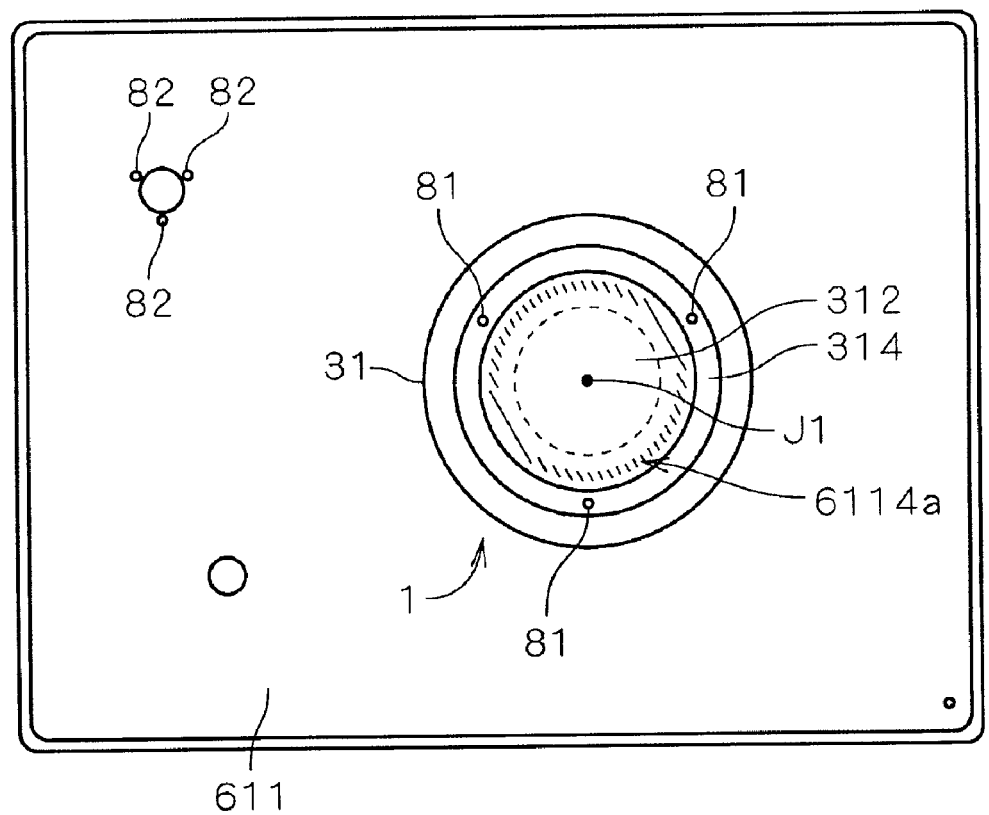
FIG. 15 is a drawing illustrating an internal configuration of a motor assembly according to a fourth preferred embodiment of the present invention.

FIG. 15 is a plan view illustrating the motor assembly 600 according to the fourth preferred embodiment of the present invention. Similar to the third preferred embodiment of the present invention, in the fourth preferred embodiment of the present invention, the motor assembly includes the base 611 and the motor 1 arranged thereon. The configuration of the motor assembly 600 according to the fourth preferred embodiment of the present invention is similar to that described in FIGS. 11 and 12, but in the fourth preferred embodiment of the present invention, the dummy disk 4a is not mounted on the motor 1 of the motor assembly 600.

Figure 16:
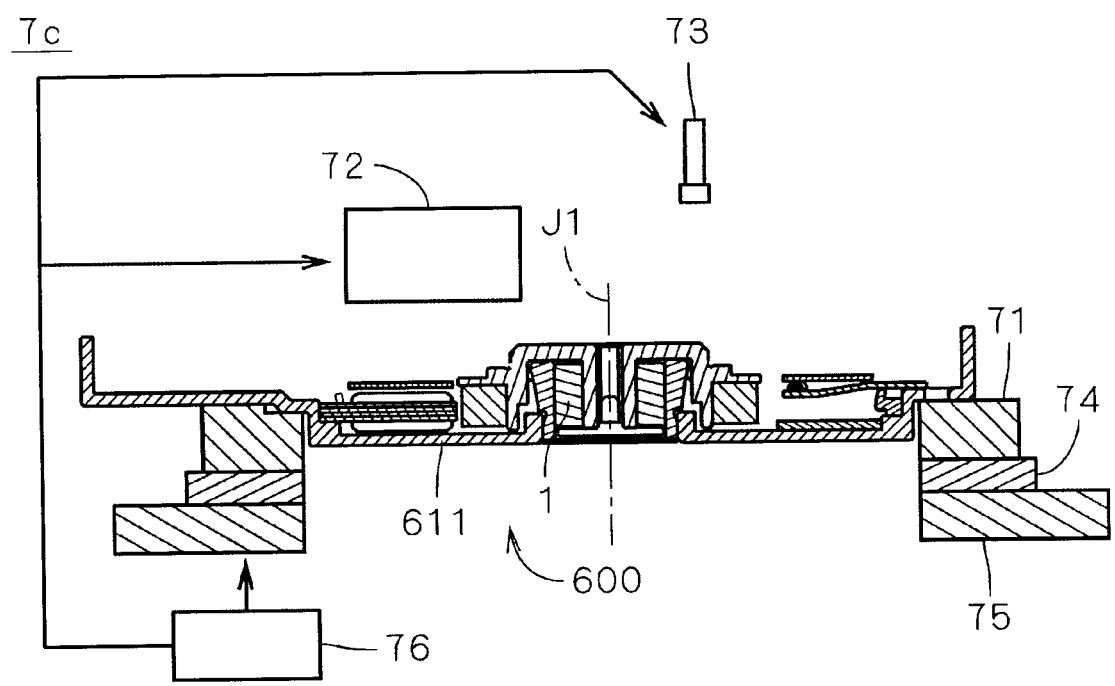
FIG. 16 is a drawing illustrating a configuration of a manufacturing device of the motor assembly.

FIG. 16 is a cross sectional view illustrating a configuration of a manufacturing device 7c of the motor assembly according to a fourth preferred embodiment of the present invention. In the manufacturing device 7c, as illustrated in FIG. 16, the heating mechanism 73 radiating the energy beam to the motor assembly 600 is arranged on the same side of the base 611, the measuring mechanism 72 is arranged, relative to the supporting table 71. The rest of the configuration preferably is substantially the same as that of the manufacturing device 7 illustrated in FIG. 5, and is labeled with the same reference numerals in the description that follows.

Figure 17:
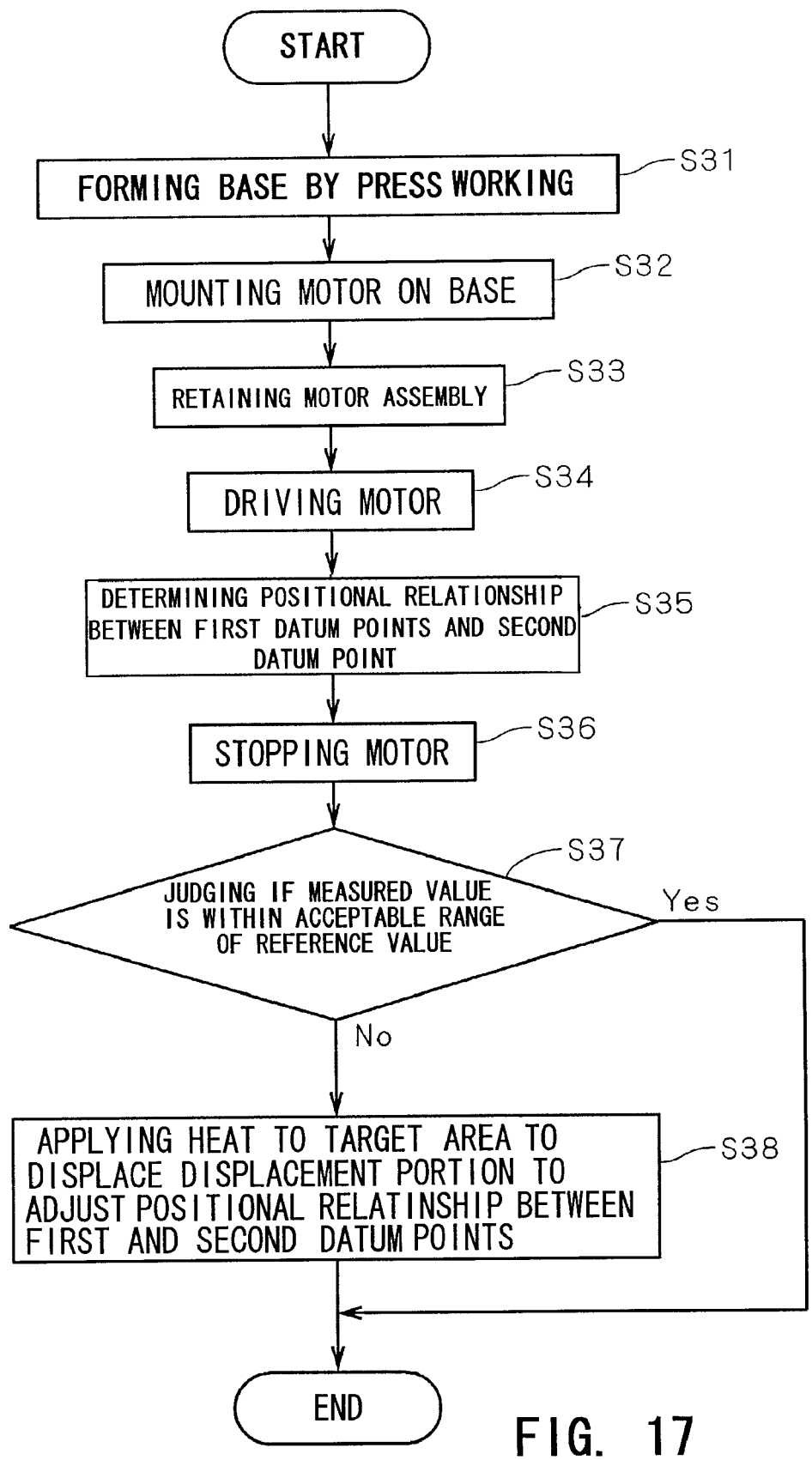
FIG. 17 is a chart setting forth process flow in the manufacture of the motor assembly.

FIG. 17 is a chart setting forth process flow in the manufacture of the motor assembly 600 according to the fourth preferred embodiment of the present invention. In manufacturing of the motor assembly 600, similar to the first preferred embodiment of the present invention, the base 611 is firstly formed by press working and the motor 1 is mounted on the base 611 (a step S31 and a step S32). The motor assembly 600 is then placed on the supporting table 71 of the manufacturing device 7c illustrated in FIG. 16, and the motor 1 is driven at its rated output power (a step S33 and a step S34).

As illustrated in FIG. 15, in the fourth preferred embodiment of the present invention, the first datum points 81 are arranged on the disk placing portion 314, at a part of the rotor hub 31 of the motor 1 on which the data storage disk 4 is to be mounted, and having an annular shape, wherein the first datum points 81 are preferably circumferentially equally separated from each other and are centered about the center axis J1. The positional relationship between the first datum points 81 and the second datum points 82 is determined by using the measuring mechanism 72 while the motor 1 is driven (a step S35).

The measuring mechanism 72 then sends the measured value to the control unit 76, and the control unit 76 compares the measured value with the reference value stored thereon. When the measured value is within the acceptable range of the reference value, manufacturing of the motor assembly 600 is finished (a step S36 and a step S37).

When the measured value is out of the acceptable range of the reference value, the parameter for radiating the energy beam to the motor assembly 600 is configured based on differences between the measured value and the reference value such that the positions of the first datum points 81 relative to the second datum points 82 are adjusted. In the fourth preferred embodiment of the present invention, the motor assembly 600 is rotated by the rotary mechanism 74, and the energy beam is radiated to the target area 6114a which is on an upper surface of the convex portion 312 arranged radially inside of the disk placing portion 314 to heat and deform at and around the target area 6114a, wherein the energy beam is radiated from the axially upper side (i.e., the side same from which the data storage disk 4 is mounted on the motor 1).

Figure 18:
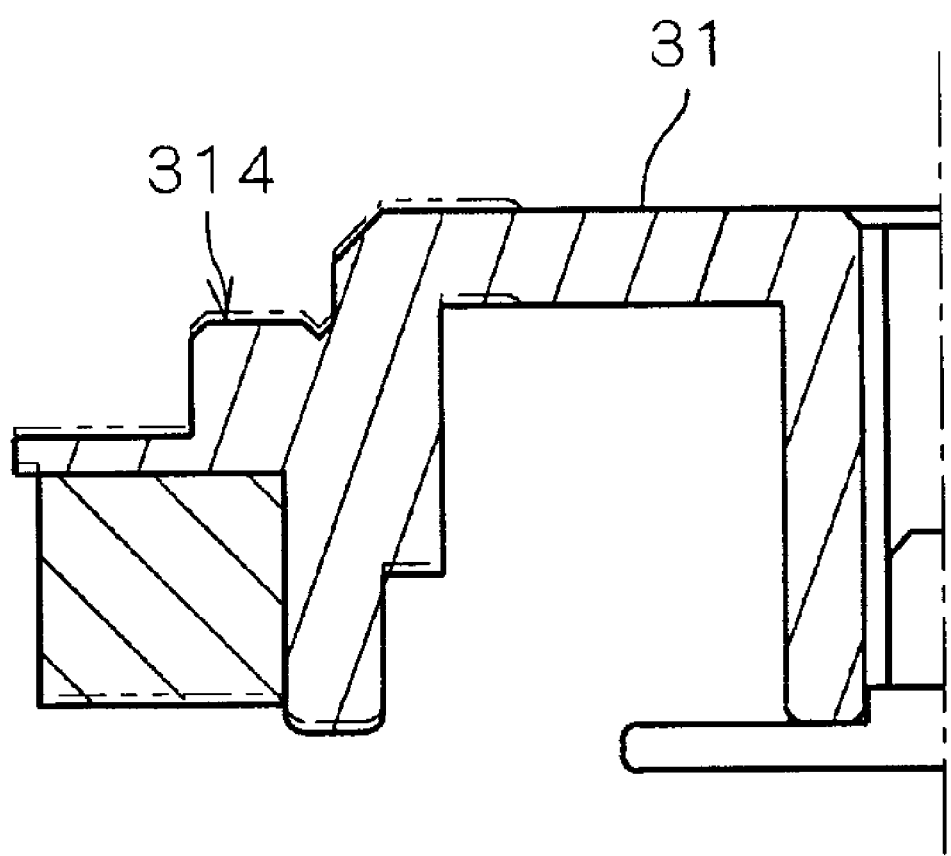
FIG. 18 is a vertical section view illustrating a disk placing portion of the rotor hub in a magnified manner.

FIG. 18 is a vertical sectional view illustrating the disk placing portion 314 of the rotor hub 31 in a magnified manner. In the fourth preferred embodiment of the present invention, due to the deformation of the target area 6114*a* (see FIG. 15), a portion of the rotor hub 31 radially outside of the target area 6114*a* is displaced toward the side from which the energy beam is radiated as illustrated in FIG. 18 by the double dot chain line, and thus the first datum points 81 arranged on the disk placing portion 314 is displaced such that the measured value is within the acceptable range of the reference value. Through this step, positions of the first datum points 81 relative to the second datum points 82 is adjusted along the center axis J1 such that the positional difference between them are within the reference value, and manufacturing of the motor assembly 600 is finished (a step S38). It should be noted that the amount of deformation of the disk placing portion 314 is illustrated with a greater emphasis in FIG. 18 for an explanatory purpose.

After manufacturing of the motor assembly 600, the head assembly 631 and the ramp 632 are mounted on the base 611, the data storage disk 4 is mounted to the motor 1, and plate member 612 is mounted to the base 611 to complete manufacturing of the storage disk drive 60 as illustrated in FIG. 1.

According to the fourth preferred embodiment of the present invention, similar to the first preferred embodiment of the present invention, the positional relationship between the first datum points 81 and the second datum points 82 along the center axis J1 may be highly precisely adjusted by heating and deforming a part of the rotor hub 31 at and around the target area 6114*a* arranged radially inside of the disk placing portion 314. Thus, the positional relationship between the data storage disk 4 mounted on the motor 1 and the head 6311 is adjusted in a precise manner, preventing the access error in the storage disk drive 60.

In the method of manufacturing the motor assembly 600 according to the fourth preferred embodiment of the present invention, the target area 6114*a* may have an annular shape arranged at a radially inside portion of the disk placing portion 314. In this case, the disk placing portion 314, on which the data storage disk 4 is mounted, is directly deformed, the position of the data storage disk 4 relative to the head assembly placing portion 6112 is precisely adjusted without changing the other configuration of the storage disk drive 60 (see FIG. 1).

In the present preferred embodiment of the present invention, the first datum points 81 are preferably arranged on the disk placing portion 314 of the rotor hub 31. Alternatively, the first datum points 81 may be arranged on a portion of the convex portion 312, radially outside of the target area 6114*a* but radially inside from the disk placing portion 314. Alternatively, as described in the third preferred embodiment of the present invention, the dummy disk 4*a* may be arranged on the rotor hub 31, and the first datum points 81 may be arranged on the dummy disk 4*a*.

Next, manufacturing of a motor assembly according to the fifth preferred embodiment of the present invention will be described. The storage disk drive 60 according to the fifth preferred embodiment of the present invention has a configuration substantially the same as that illustrated in FIGS. 1, 4, and 6, and is labeled with the same reference numerals in the description that follows. Similar to the third preferred embodiment of the present invention, in the fifth preferred embodiment of the present invention, the motor assembly includes the base 611 and the motor 1 arranged thereon.

Figure 19:
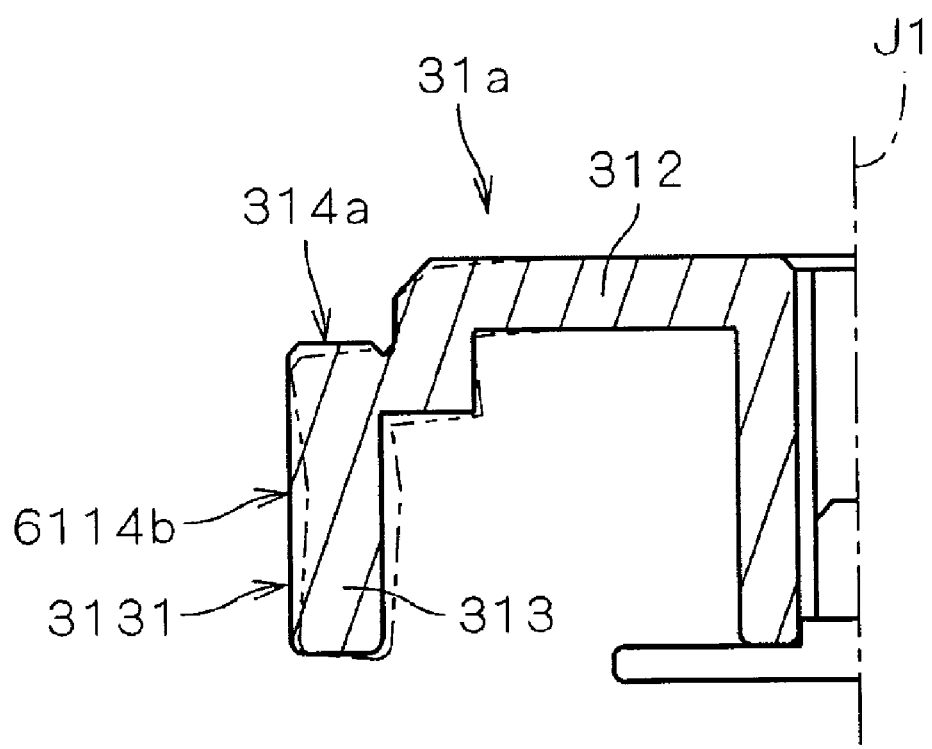
FIG. 19 is a cross sectional view illustrating a portion of the rotor hub arranged on a motor assembly according to a fifth preferred embodiment of the present invention.

FIG. 19 is a cross sectional view illustrating a part of the rotor hub 31*a* arranged on the motor according to a fifth preferred embodiment of the present invention. The motor assembly according to the fifth preferred embodiment of the present invention preferably has the rotor hub 31*a* and a disk placing portion 314*a* having configurations that are different from those of the rotor hub 31 and the disk placing portion 314 described in the foregoing preferred embodiment of the present invention. The rest of the configuration is substantially the same as that of the motor assembly 600 illustrated in FIG. 15. As illustrated in FIG. 19, the disk placing portion 314*a* has an annular shape and is arranged on axially upper end of the cylindrical portion 313 downwardly extending at radially outside of the convex portion 312.

The process flow in the manufacture of the motor assembly according to the fifth preferred embodiment of the present invention is preferably substantially the same as that described in the fourth preferred embodiment of the present invention (see FIG. 17). According to the fifth preferred embodiment of the present invention, the energy beam directed in the radial direction is radiated to the target area 6114*b* arranged on and extending circumferentially along a radially outside surface 3131 of the cylindrical portion 313, and heat is applied thereto. The cylindrical portion 313 axially extends from a radially outside of the disk placing portion 314*a* toward the base 611. Through the configuration, in which the target area 6114*a* extends circumferentially around the cylindrical potion 313 and the energy beam is radiated thereto, the rotor hub 31 is deformed at and around the radially outside surface 3131.

By radiating the energy beam to the target area 6114*b*, an upper portion of the cylindrical portion 313 which is arranged axially upside from the target area 6114*a* and a lower portion of the cylindrical portion 313 which is arranged axially lower side from the target area 6114*a* are displaced to the radially inner direction, and thus, the disk placing portion 314*a*, on which the first datum points 81 are arranged, are displaced to the axially lower direction such that the measured value is to be within the acceptable range of the reference value.

In FIG. 19, a shape of the deformed rotor hub 31 after the energy beam is radiated thereto is illustrated by the double dot chain line. As illustrated in FIG. 19, due to the displacement of the disk placing portion 314*a*, a positional relationship between the first datum points 81 and the second datum points 82 is adjusted along the center axis J1 such that the positional difference between them are within the reference value. In FIG. 19, the degree of adjustment of the relative position of the disk placing portion 314*a* is illustrated with a greater emphasis for the convenience of illustration.

According to the fifth preferred embodiment of the present invention, similar to the first preferred embodiment of the present invention, the positions of the first datum points 81 relative to the second datum points 82 along the center axis J1 may be highly precisely adjusted by heating and deforming a part of the rotor hub 31 at and around the target area 6114*b* arranged on the radially outside surface 3131 of the cylindrical portion 313. Thus, the position of the data storage disk 4 mounted on the disk placing portion 314*a* of rotor hub 31 relative to the head 6311 is adjusted in a precise manner.

In manufacturing of the motor assembly according to the fifth preferred embodiment of the present invention, the target area 6114*b* extends along an entire circumference of the cylindrical portion 313 on the radially outside surface 3131, enabling adjustment of the position of the first datum points 81 relative to the second datum points 82 in a precise manner.

In the present preferred embodiment of the present invention, the first datum points 81 are arranged on the disk placing portion 314a of the rotor hub 31. Alternatively, as described in the third preferred embodiment of the present invention, the dummy disk 4a may be arranged on the rotor hub 31, and the first datum points may be arranged on the dummy disk 4a.

Next, a method of manufacturing a motor assembly according to the sixth preferred embodiment of the present invention will be described. In the sixth preferred embodiment of the present invention, similar to the first and the second preferred embodiments of the present invention, the base 611 is referred to as the motor assembly. The configuration of the motor assembly according to the sixth preferred embodiment of the present invention is preferably substantially the same as that illustrated in FIGS. 4 and 6, and is labeled with the same reference numerals in the description that follows.

The process flow in the manufacture of the motor assembly according to the sixth preferred embodiment of the present invention preferably is substantially the same as that described in the first preferred embodiment of the present invention (see FIG. 9). In the manufacturing method according to the sixth preferred embodiment of the present invention, the positions of the first datum points 81 relative to the second datum points 82 (see FIG. 4) and the positional relationship of each of three first datum points 81 relative to the third datum points 83 are measured in the step S13 illustrated in FIG. 9. Based on the measured data, a degree of inclination of the displacement portion 6115 arranged on the motor placing portion 6111, relative to the center axis J1, is determined.

In the step S15, the heat is applied to the target area 6114 having the circular shape 6114 centered about the center axis J1 unevenly such that the position of the first datum points 81 relative to the second datum points 82 and the inclination of the displacement portion 6115 relative to the center axis J1 are adjusted. The heat is applied to the target area 6114 unevenly by configuring the pulse interval to be smaller in the particular portion of the target area 6114. Through the configuration, the energy applied to the specific portion of the target area 6114 greater than other portions, enabling adjustment of not only the positions of the first datum points 81 relative to the second datum points 82 along the center axis J1 but also the inclination of the displacement portion relative to the center axis J1.

It should be noted, however, other parameters such as the spot radius, the peak power, the pulse width, the pulse pitch, the rotational speed, the radiation time, a width and/or shape of the target area to which the energy beam is radiated, and the like, may be adjusted to make the energy applied to the target area 6114 uneven.

Figure 20:
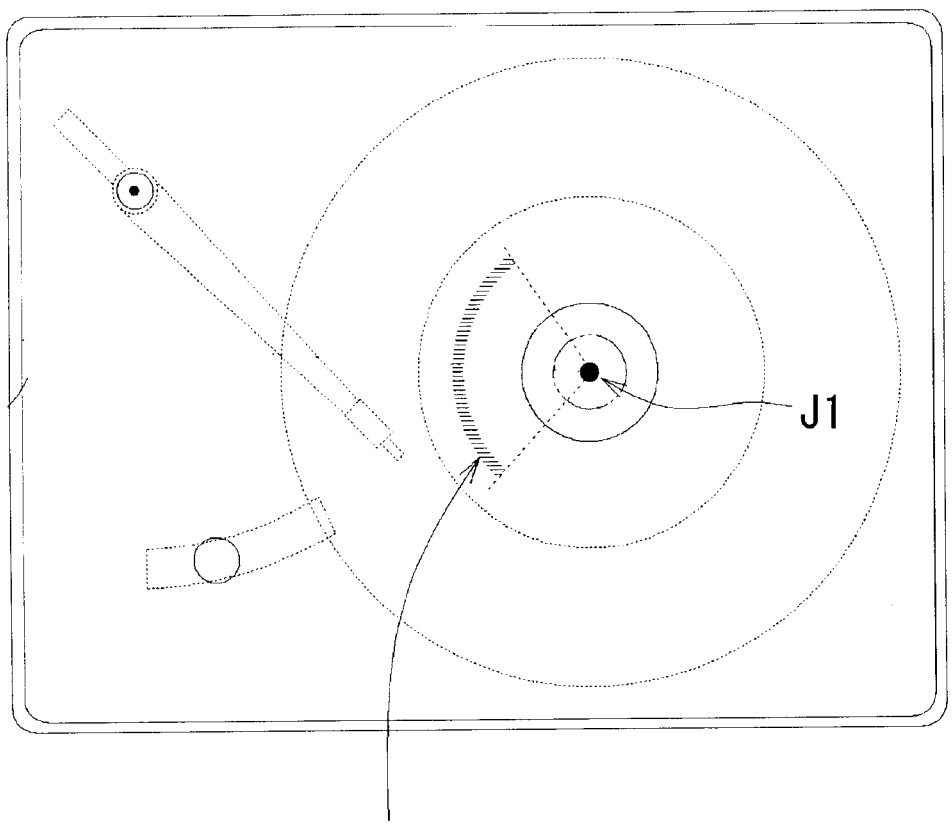
FIG. 20 is a plan view illustrating the motor assembly.

For example, the target area 6114 may have an arc shape centered about the center axis J1 arranged around the motor placing portion of the base (see FIG. 20). In this case, the spot radius, the peak power, the pulse width, the pulse pitch, and the rotational speed of the motor assembly are hold substantially constant, while the center angle of the arc shape of the target area 6114 to which the energy beam is radiated, is controlled. Meanwhile, the total radiation time of the energy beam is controlled to change the center angle of arc shape of the target area 6114. The target area 6114 may include a plurality arc shape areas to which the energy beam is radiated. For example, the target area 6114 may include each of the arc shape areas centered about the center axis and circumferentially separated from each other. Meanwhile, the target area 6114 may includes each of the arc shape areas centered about the center axis and having a radius different from each other such that each of the arc shape areas is radially separated from each other.

In the present preferred embodiment of the present invention, the distances from the measuring mechanism 72 and to three of the first datum points 81 preferably are measured respectively to determine the degree of inclination of the displacement portion 6115. However, the inclination of the displacement portion 6115 may be determined by measuring the distance between the measuring mechanism 72 and one first datum point 81 by using an auto-collimator, for example.

The adjustment of the inclination according to the sixth preferred embodiment of the present invention may be applied to the method of manufacturing the motor assembly according to the first, the second, the third, and the fifth preferred embodiments of the present invention.

While various preferred embodiments of the present invention have been described above, the present invention is not limited to the preferred embodiments described, and various modifications are possible.

In the first preferred embodiment of the present invention, the first datum points 81, the second datum points 82, and the third datum points 83 may be arranged on the exterior surface of the base 611. In this case, the measuring mechanism 72 of the manufacturing device 7 is arranged axially downward of the supporting table 72 illustrated in FIG. 5.

In the first preferred embodiment of the present invention, the positional relationship between the first datum points 81 and the second datum points 82 are preferably determined by comparing the position of each datum points with the third datum point 83 provided as a reference point. However, the positional relationship may be determined by any other suitable method. For example, the positional relationship between the first and the second datum points 81, 82 may be determined by comparing the positions of them from each other directly. In this case, a position at which the measuring mechanism is arranged is recognized as the reference point, and the positional relationship between the first datum points 81 and the second datum point 82 is determined by measuring the distance between the measuring mechanism and each of the first and the second datum points 81, 82, and comparing the positions of the first datum points 81 with the second datum points 82 directly.

In the third preferred embodiment of the present invention, the dummy disk 4a is mounted on the rotor hub 1. Alternatively, the data storage disk 4 may be mounted on the motor 1 and the first datum points 81 may be arranged on the data storage disk 4.

In the preferred embodiments of the present invention, the target area to which the heat is applied may be an entire circumference of the displacement portion or may be a part of circumference of the deformed portion. For example, the target area may extend on at least a part of the virtual circle centered about the center axis J1. In various preferred embodiments of the present invention, the target area may be defined with a plurality of areas arranged in an axial symmetric manner.

In preferred embodiments of the present invention, the laser displacement gauge, auto-collimator, and the like are preferably used for the measuring mechanism 72. Alternatively, any other suitable means (e.g., an electrostatic capacitor type displacement gauge and a contact type displacement gauge) may be used for the measuring mechanism 72.

To apply heat precisely to the target area, it is preferable to use the energy beam radiation device (e.g., the laser beam source and the electron beam source) as the heating mechanism 73. It should be noted, however, other heating devices that are able to apply heat to the target area (e.g., infrared beam source, high-temperature gas discharge, a burner, electromagnetic induction, and the like) may be used as the heating mechanism 73.

According to the preferred embodiments of the present invention, the base 611 of the motor assembly is preferably formed by press working. Alternatively, the base 611 may be formed by any other suitable methods, such as cutting.

A motor according to the preferred embodiments of the present invention does not necessarily have to be a so-called inner-rotor type, in which the rotor magnet is disposed to the center-axis J1 side of the armature, but may be an outer-rotor type, in which the rotor magnet is disposed to the outside of the armature. Still another possible modification is that so-called air-pressure bearings, in which air serves as the working fluid, may be used as the bearing mechanism. Alternatively, a ball bearing may be used as the bearing mechanism in the motor.

The motor according to the preferred embodiments of the present invention may be used for an optical disk drive device, a magnetic optical disk drive device and any other suitable device.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A method of manufacturing a motor assembly for a data storage drive device, the method comprising the steps of:
   providing a motor assembly including a motor placing portion and an access unit placing portion, the motor placing portion including at least a portion of a base of the motor assembly which includes a plate-shaped flat portion and a motor to spin a data storage disk centered about a center axis on a disk placing portion of the motor, and the access unit placing portion including a portion of the base of the motor assembly which includes a plate-shaped flat portion and an access unit to read and/or write information on the data storage disk;
   measuring a positional relationship between a first datum point and a second datum point; and
   applying heat to a target area of the motor assembly such that at least a part of a displacement portion is displaced toward a direction from which the heat is applied such that the positional relationship between the first datum point and the second datum point is adjusted; wherein
   the first datum point is arranged at a portion of the motor placing portion that corresponds to a location of the disk placing portion; and
   the second datum point is arranged on the base of the motor assembly.

2. The method as set forth in claim 1, wherein the target area is at least a part of an outer circumferential portion of the displacement portion arranged on at least one of the motor placing portion and the access unit placing portion.

3. The method as set forth in claim 1, wherein the second datum point is arranged at the access unit placing portion.

4. The method as set forth in claim 1, wherein a heat assembly which pivots about a pivot axis is mounted to the access unit placing portion, and a plurality of the second datum points are arranged around the access unit placing portion and centered about the pivot axis.

5. The method as set forth in claim 1, further comprising step of moving the motor to the motor placing portion prior to the measuring step being performed.

6. The method as set forth in claim 5, wherein the first datum point is arranged on a portion of the motor to which the data storage disk is to be mounted.

7. The method as set forth in claim 5, wherein the motor arranged on the motor placing portion of the motor assembly includes a discoid member rotated in accordance with a rotation of the motor, and the first datum point is arranged on the discoid member.

8. The method as set forth in claim 5, wherein the motor moved to the motor placing portion prior to the measuring step is rotated during adjustment of the positional relationship between the first datum point and the second datum point.

9. The method as set forth in claim 1, wherein the positional relationship between the first datum point and the second datum point is determined by measuring a distance from a predetermined reference point to the first datum point and from the predetermined reference point to the second datum point by using a measuring mechanism in the measuring step.

10. The method as set forth in claim 9, wherein a third datum point is arranged on the base of the motor assembly, the third datum point defines the predetermined reference point.

11. The method as set forth in claim 9, wherein the measuring mechanism is arranged at a predetermined reference point outside the motor assembly, and a positional relationship between the first datum point and the second datum point is determined by measuring a distance between the measuring mechanism and the first datum point and between the measuring mechanism and the second datum point respectively in a non-contact manner.

12. The method as set forth in claim 9, wherein the measuring mechanism is at least one of a laser displacement gauge and an auto-collimator.

13. The method as set forth in claim 1, wherein the displacement portion of the motor assembly is pressed along the center axis from a side to which the heat is applied while the heat is applied to the target area in the heat applying step.

14. The method as set forth in claim 1, wherein a portion around the displacement portion of the motor assembly is pressed along the center axis from an opposite side to which the heat is applied while the heat is applied to the target area in the heat applying.

15. The method as set forth in claim 1, wherein the target area extends along an entire circumference of a virtual circle centered about the center axis and surrounding the displacement portion, and the displacement portion is displaced along the center axis toward a direction from which the heat is applied.

16. The method as set forth in claim 15, wherein the target area includes a plurality of substantially circular areas centered about the center axis, each of the substantially circular areas has a radius that is different from that of the other substantially circular areas.

17. The method as set forth in claim 1, wherein the target area is a part of an entire circumference of a virtual circle centered about the center axis and a part of the displacement portion is displaced toward a direction from which the heat is applied such that an inclination of the center axis of the motor is adjusted.

18. The method as set forth in claim 16, wherein the target area has an arc shape centered about the center axis.

19. The method as set forth in claim 17, wherein the target area includes a plurality of arc shape areas centered about the center axis, and the plurality of arc shape areas are circumferentially separated from each other.

20. The method as set forth in claim 17, wherein the target area includes at least two arc shape areas centered about the center axis and the at least two arc shape areas have a radius that is different from each other such that the at least two arc shapes are radially separated from each other.

21. The method as set forth in claim 1, wherein the heat is applied to the target area arranged on the motor assembly by radiating energy beams to the target area such that the heat is applied to the target area in a non-contact manner in the heat applying step.

22. The method as set forth in claim 20, wherein the energy beam is at least one of a laser beam, an infrared beam, and an electron beam.

23. The method as set forth in claim 21, wherein the energy beam is a pulse YAG laser beam.

24. The method as set forth in claim 22, wherein the target area includes a plurality of small spots and a single pulse of the YAG laser beam is radiated to each of the plurality of small spots.

25. The method as set forth in claim 1, wherein a total amount of energy applied to the target area is controlled based on the positional relationship between the first datum point and the second datum point such that an amount of displacement of the displaced portion of the motor assembly is adjusted.

26. The method as set forth in claim 24, wherein an energy beam is radiated to the target area to apply heat to the target area, the total amount of energy applied to the target area is controlled by modifying at least one of a pulse number of a pulse energy beam per unit time when a pulse energy beam is radiated to the target area, a peak power of the energy beam, a length of time of each pulse of the energy beam, and a distance between each pulse of the energy beam, a total radiation time of the energy beam, and a shape of the target area to which the energy beam is radiated.

27. The method as set forth in claim 24, wherein an energy beam is radiated to the target area to apply heat to the target area, the total amount of energy applied to the target area is controlled by modifying one of the pulse number of the pulse energy beam per unit time, a peak power of the energy beam, a length of time of each pulse of the energy beam, and a total radiation time of the energy beam, while other parameters are held substantially constant.

28. The method as set forth in claim 26, wherein the pulse number of the pulse energy beam per unit time is controlled.

29. The method as set forth in claim 26, wherein the total radiation time of the energy beam is controlled.

30. The method as set forth in claim 1, wherein an energy beam is radiated to apply heat to the target area while the motor assembly is rotated about the center axis.

31. The method as set forth in claim 26, wherein a speed of rotating the motor assembly is controlled while a pulse number of a pulse energy beam per unit time when the pulse energy beam is radiated to the target area and a peak power of the energy beam are held substantially constant.

32. The method as set forth in claim 1, wherein the base of the motor assembly is formed by press working.

33. A motor assembly for use in a storage disk drive for spinning a data storage disk and manufactured according to the method as forth in claim 1, wherein the motor assembly includes the target area melted by the heat applied thereto.

34. A method of manufacturing a motor assembly for a data storage drive device, the method comprising the steps of:
providing a motor assembly including a motor placing portion and an access unit placing portion, the motor placing portion including at least a portion of a base of the motor assembly which includes a plate-shaped flat portion and a motor to spin a data storage disk centered about a center axis, and the access unit placing portion including a portion of the base of the motor assembly which includes a plate-shaped flat portion and an access unit to read and/or write information on the data storage disk;
measuring a positional relationship between a first datum point and a second datum point; and
applying heat to a target area of the motor assembly such that at least a part of a displacement portion is displaced toward a direction from which the heat is applied such that the positional relationship between the first datum point and the second datum point is adjusted; wherein
the first datum point is arranged at the motor placing portion or on a member arranged on the motor placing portion, and the second datum point is arranged at the access unit placing portion or a member arranged on the access unit placing portion.

* * * * *